US009829242B2

(12) United States Patent
Satou et al.

(10) Patent No.: US 9,829,242 B2
(45) Date of Patent: Nov. 28, 2017

(54) REFRIGERATION DEVICE

(71) Applicant: DAIKIN INDUSTRIES, LTD., Osaka-Shi, Osaka (JP)

(72) Inventors: Kiichirou Satou, Sakai (JP); Hisaaki Takaoka, Osaka (JP); Yuusuke Fujimoto, Sakai (JP); Hideaki Kuriyama, Sakai (JP); Norio Iga, Osaka (JP)

(73) Assignee: Daikin Industries, Ltd., Osaka (JP)

( * ) Notice: Subject to any disclaimer, the term of this patent is extended or adjusted under 35 U.S.C. 154(b) by 197 days.

(21) Appl. No.: 14/653,585

(22) PCT Filed: Dec. 27, 2013

(86) PCT No.: PCT/JP2013/007700
§ 371 (c)(1),
(2) Date: Jun. 18, 2015

(87) PCT Pub. No.: WO2014/103339
PCT Pub. Date: Jul. 3, 2014

(65) Prior Publication Data
US 2015/0330703 A1 Nov. 19, 2015

(30) Foreign Application Priority Data

Dec. 28, 2012 (JP) ................................. 2012-288225

(51) Int. Cl.
*F25D 29/00* (2006.01)
*G05B 15/02* (2006.01)

(52) U.S. Cl.
CPC ............. *F25D 29/00* (2013.01); *G05B 15/02* (2013.01); *F25D 2400/28* (2013.01); *F25D 2700/12* (2013.01)

(58) Field of Classification Search
CPC .. F25D 29/00; F25D 2700/12; F25D 2400/28; F25D 29/006; F25D 2400/30;
(Continued)

(56) References Cited

U.S. PATENT DOCUMENTS 4,220,197 A * 9/1980 Schaefer ............ B60H 1/00007
165/263
6,393,852 B2 * 5/2002 Pham ........................ A47F 3/04
62/228.3
(Continued)

FOREIGN PATENT DOCUMENTS

EP 1681524 A1 7/2006
JP 62-84278 A 4/1987
(Continued)

OTHER PUBLICATIONS

International Search Report issued in PCT/JP2013/007700, dated Mar. 25, 2014.

*Primary Examiner* — Mohammad M Ali
(74) *Attorney, Agent, or Firm* — Birch, Stewart, Kolasch & Birch, LLP

(57) ABSTRACT

A refrigeration device executes a chilling operation for cooling an interior so that the temperature of the interior reaches a set temperature that is set within a predetermined temperature range. The refrigeration device has an operation control unit that, in the chilling operation, switches between pull-down control and capacity control for cooling the interior with a cooling capacity lower than that of the pull-down control. The operation control unit performs the pull-down control until the temperature of air blown toward the interior reaches at least the set temperature.

14 Claims, 10 Drawing Sheets

(58) Field of Classification Search
CPC ..... F25D 2700/16; G05B 15/02; G05B 17/02; G05B 19/02; G05B 21/02
USPC .......................................... 62/157; 700/300
See application file for complete search history.

(56) References Cited

U.S. PATENT DOCUMENTS

| | | | |
|---|---|---|---|
| 6,826,917 B1* | 12/2004 | Bodell, II | F25B 49/022 62/115 |
| 7,908,039 B2* | 3/2011 | Kaga | F25B 49/025 236/44 B |
| 2005/0132733 A1* | 6/2005 | Rafalovich | F25D 29/00 62/199 |
| 2009/0038322 A1* | 2/2009 | Senf, Jr. | F25B 41/062 62/117 |
| 2009/0248218 A1* | 10/2009 | Dyrmose | F25D 29/003 700/300 |
| 2010/0263393 A1* | 10/2010 | Chen | F25B 1/10 62/115 |
| 2010/0281894 A1* | 11/2010 | Huff | F25B 9/008 62/115 |
| 2011/0174014 A1* | 7/2011 | Scarcella | F25B 1/10 62/510 |
| 2011/0209490 A1* | 9/2011 | Mijanovic | B60H 1/00885 62/190 |
| 2011/0302939 A1* | 12/2011 | Rockenfeller | H02P 1/30 62/89 |
| 2014/0096553 A1 | 4/2014 | Satou et al. | |

FOREIGN PATENT DOCUMENTS

| | | |
|---|---|---|
| JP | 63-187061 A | 8/1988 |
| JP | 3-181766 A | 8/1991 |
| JP | 2012-255631 A | 12/2012 |

\* cited by examiner

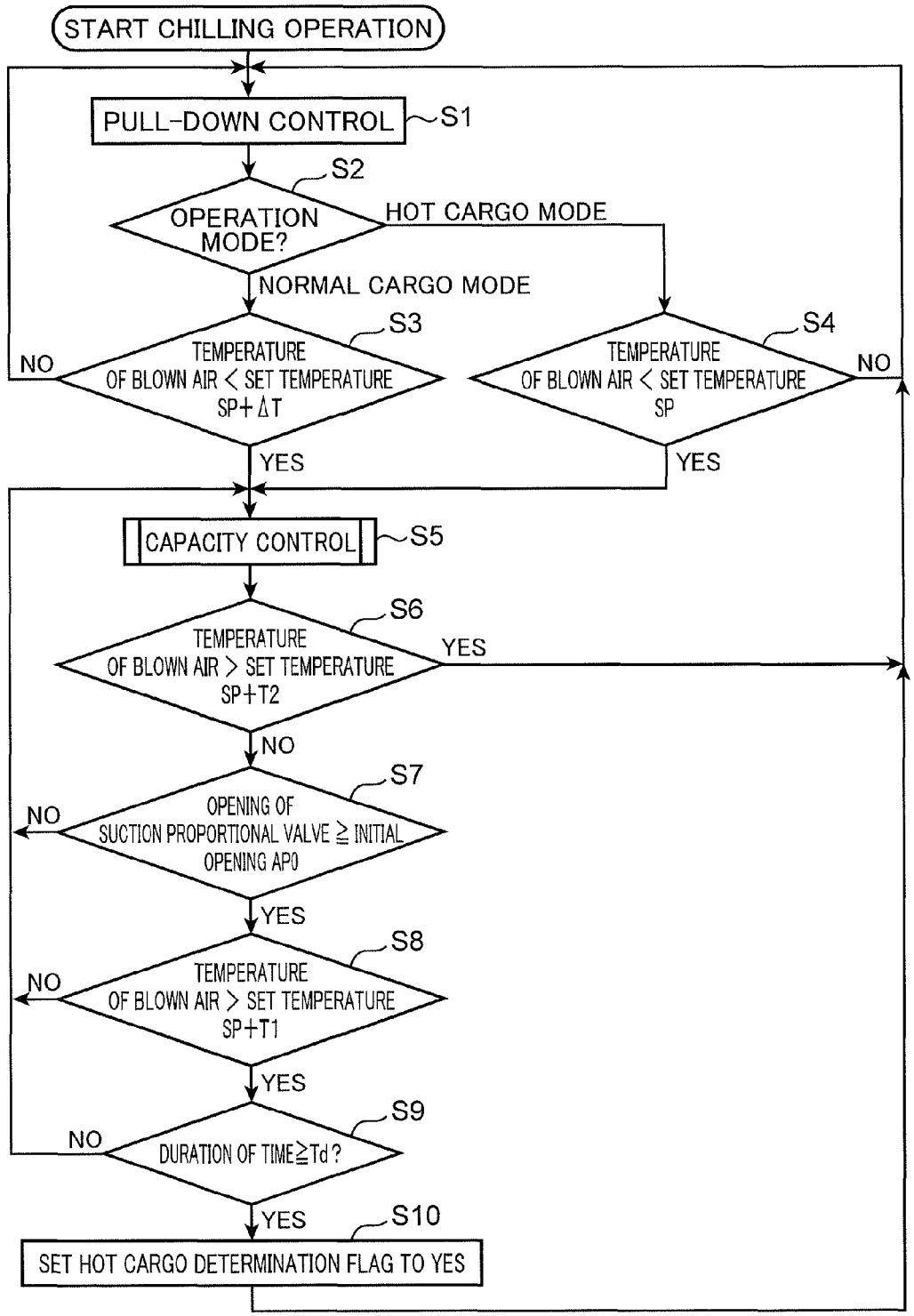

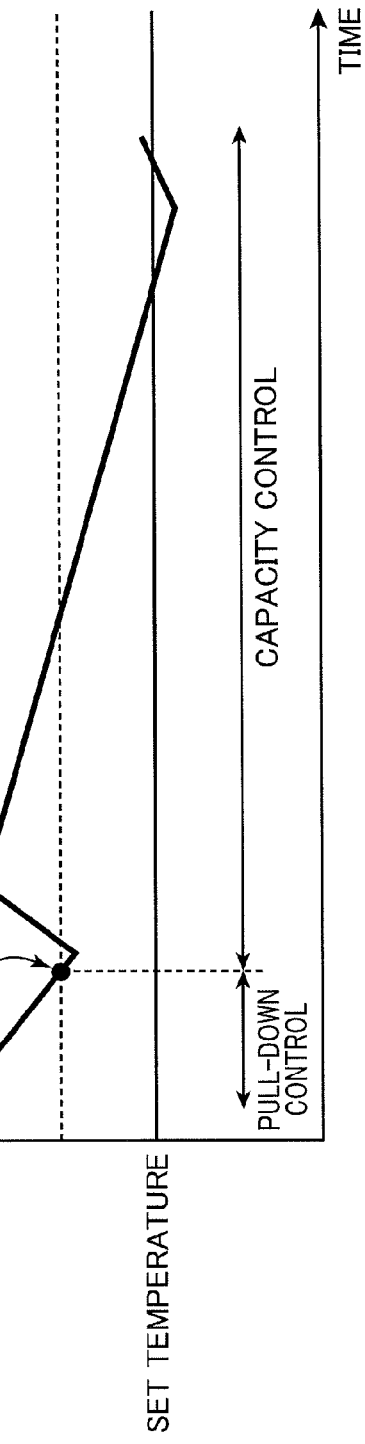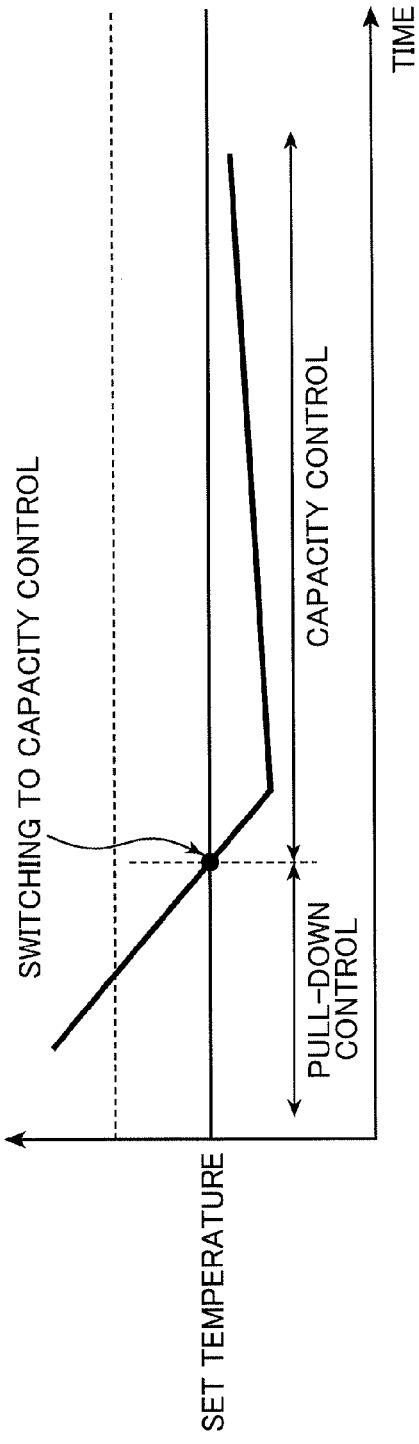
FIG. 6A
FIG. 6B

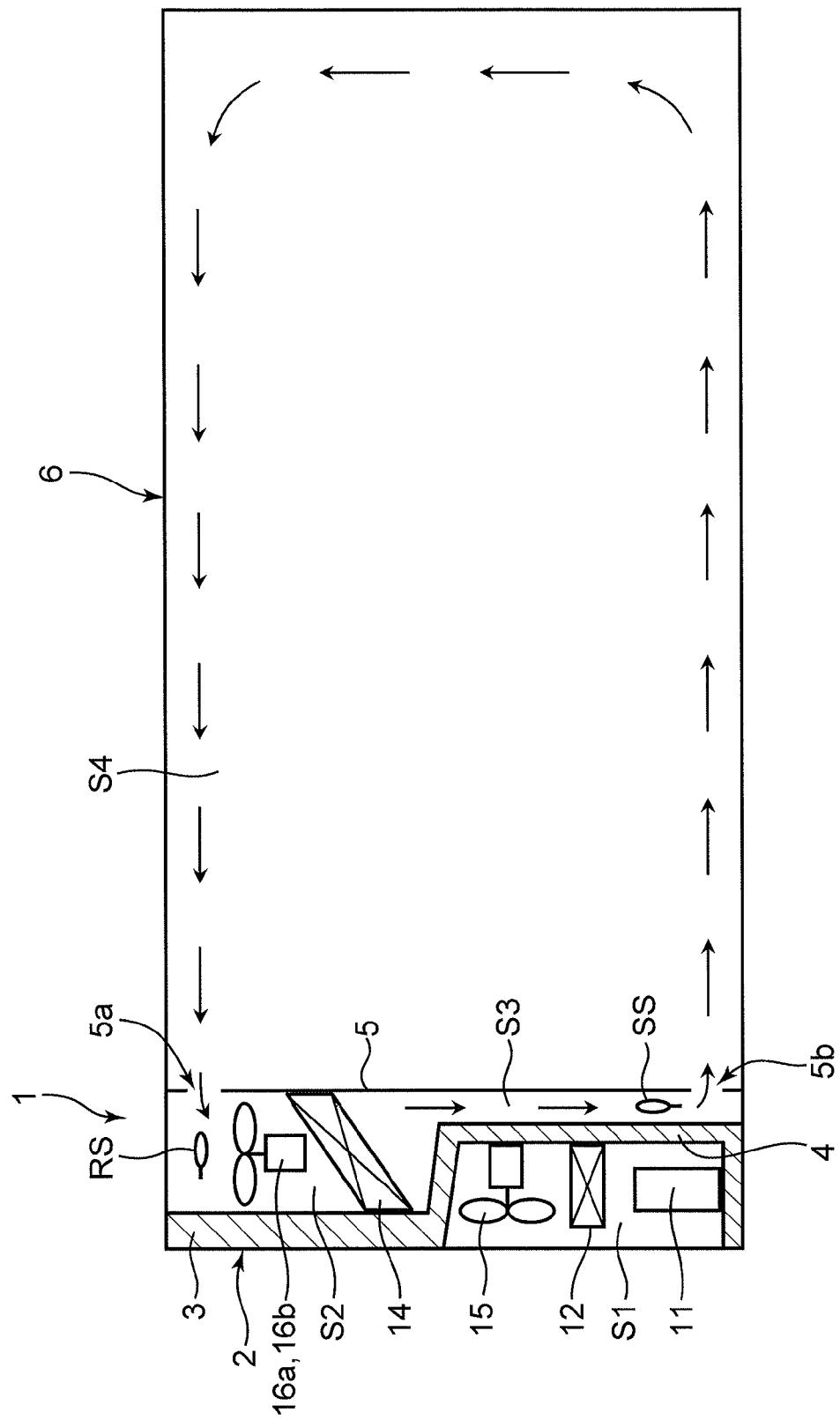

REFRIGERATION DEVICE

TECHNICAL FIELD

The present invention relates to a refrigeration device capable of a chilling operation, and more particularly to a technique for appropriately changing the cooling capacity during the chilling operation according to the temperature of the interior of a container.

BACKGROUND ART

A conventional refrigeration device used in a container and the like switches between a freezing operation for reducing the temperature of the interior of the container to a set temperature lower than zero degrees Celsius to freeze the cargoes inside the container, and a chilling operation for refrigerating the cargoes inside the container with less cooling capacity than that of the freezing operation.

Patent Literature 1, for example, describes switching between a freezing mode (freezing operation) and a chilling mode (chilling operation) according to the set temperature of the interior of a container. Patent Literature 1 also describes switching between, in the chilling mode, a pull-down operation (pull-down control) for setting the capacity of the cooler at 100% to rapidly converge the temperature of the interior to the set temperature, and a fine capacity adjustment operation (capacity control) for performing PID control on the capacity of the cooler, depending on whether the temperature state of the loaded cargoes (cargoes) to be monitored that are stored in terminal boxes falls within an optimal temperature range close to the set temperature, the terminal boxes being provided at the air outlet opened to the interior and an air suction port opened from the interior.

For example, the chilling operation described in the foregoing prior art switches from the pull-down control to the capacity control when the temperature of the cargoes drops to fall within the optical temperature range close to the set temperature as shown in, for example, FIG. 6A. Therefore, for example, in a case where the interior contains a large number of hot cargoes with fresh produce that emit gas, such as durians, there is a possibility that the temperature of the interior increases unexpectedly rapidly due to the respiration heat generated when the gas is released from the hot cargoes during the transition from the pull-down control to the capacity control. In such a case, if the temperature of the interior is reduced to the set temperature by means of the capacity control with a cooling capacity lower than that of the pull-down control, it takes longer to reduce the temperature of the interior. Furthermore, depending on how much the temperature of the interior increases, the cooling capacity of the capacity control might not be enough to reduce the temperature of the interior to the set temperature.

CITATION LIST

Patent Literature

Patent Literature 1: Japanese Unexamined Patent Publication No. H3-181766

SUMMARY OF INVENTION

An object of the present invention is to provide a refrigeration device capable of a chilling operation in which the time it takes to reduce the temperature of the interior of a container to a set temperature can be reduced.

A refrigeration device according to the present invention is a refrigeration device that executes a chilling operation for cooling the interior so that the temperature of the interior reaches a set temperature set within a predetermined temperature range, the refrigeration device being equipped with an operation control unit which, during the chilling operation, switches between pull-down control and capacity control for cooling the interior with a cooling capacity lower than that of the pull-down control, wherein the operation control unit performs the pull-down control until the temperature of air blown into the interior reaches at least the set temperature.

BRIEF DESCRIPTION OF DRAWINGS

FIG. 2 is an explanatory diagram for illustrating how an operation control unit switches between a plurality of controls during a chilling operation, where

FIG. 3 is a flowchart showing an example of a flow in which the operation control unit switches between the pull-down control and the capacity control during the chilling operation.

FIG. 6 is an explanatory diagram showing a problem that occurs when switching from the pull-down control to the capacity control during the chilling operation, where FIG. 6A shows an example of switching from the pull-down control to the capacity control when the temperature of blown air is higher than the set temperature by a predetermined temperature, and FIG. 6B shows an example of switching from the pull-down control to the capacity control when the temperature of the blown air is equal to the set temperature.

FIG. 7 is a cross-sectional diagram showing a schematic configuration of the refrigeration device.

DESCRIPTION OF EMBODIMENTS

Figure 1:
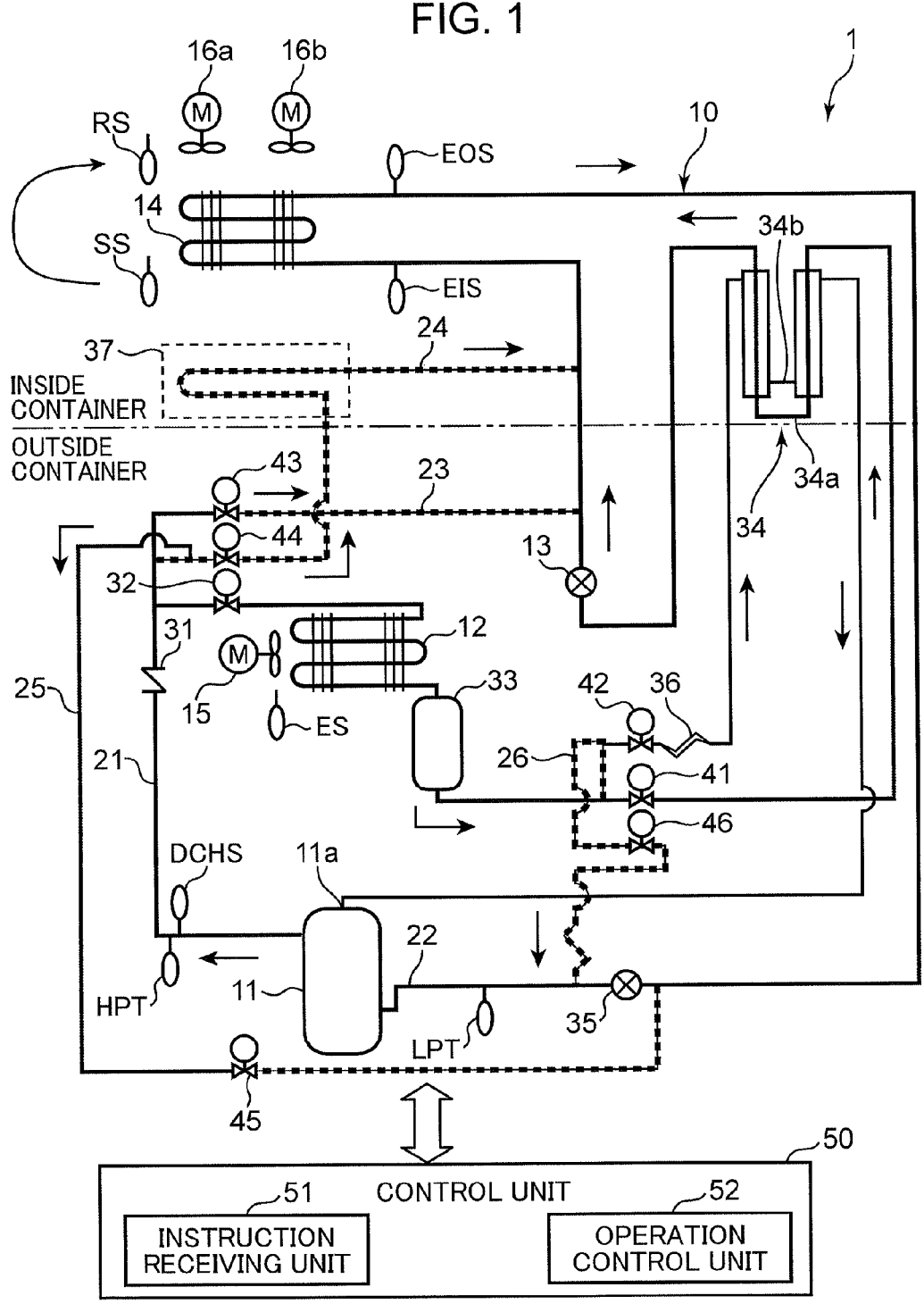
FIG. 1 is a schematic configuration diagram showing an example of the configuration of a refrigeration device according to the present invention.

A refrigeration device 1 according to embodiments of the present invention is now described hereinafter with reference to the drawings. The refrigeration device 1 of each embodiment cools the interior of a container which is used for marine transportation or the like. As shown in FIG. 1, the refrigeration device 1 has a refrigerant circuit 10 that performs vapor compression refrigeration cycle, with a refrigerant circulating therein.

First Embodiment

In the refrigerant circuit 10, a compressor 11, a condenser 12, an expansion valve 13, and an evaporator (interior heat exchanger) 14 are connected to one another by pipes, in which the refrigerant circulates.

The compressor 11 is configured with, for example, a fixed capacity scroll compressor in which the compressor motor has a constant rotational speed. The condenser 12 is disposed on the outside of the container and configures a so-called air-cooled condenser. An exterior fan 15 for blowing air to the condenser 12 is provided in the vicinity of the condenser 12. The condenser 12 performs heat exchange between the outside air blown by the exterior fan 15 and the refrigerant.

The expansion valve 13 is configured with, for example, an electric expansion valve, the opening of which is adjustable. The expansion valve 13 has its opening adjusted under control by a control unit 50, described hereinafter, in such a manner that it increases as the temperature outside the container (outside air temperature) rises. Therefore, the amount of refrigerant flowing to the evaporator 14 increases as the outside air temperature rises, enhancing the heat exchanging capacity of the evaporator 14.

The evaporator 14 is disposed inside the container and configures a cooling heat exchanger for cooling the interior. Interior fans 16a, 16b for sending the interior air of the container to the evaporator 14 while circulating the interior air are provided in the vicinity of the evaporator 14. Heat exchange between the interior air sent by the interior fans 16a, 16b and the refrigerant takes place in the evaporator 14. The refrigeration device 1 is provided with these two interior fans 16a, 16b, but the number of interior fans is not limited thereto, and the refrigeration device may be provided with only one interior fan.

A discharge pipe 21 of the compressor 11 is connected to the inflow terminal of the condenser 12 by a check valve 31 and a discharge pressure regulating valve 32. The outflow terminal of the condenser 12 is connected to the expansion valve 13 via a receiver 33, a liquid solenoid valve 41, and a high-pressure-side channel 34a of an economizer heat exchanger 34. A suction pipe 22 of the compressor 11 is connected to the outflow terminal of the evaporator 14 via a suction proportional valve 35. The inflow terminal of the evaporator 14 is connected to the expansion valve 13.

The economizer heat exchanger 34 exchanges heat between the refrigerant flowing through the high-pressure-side channel 34a and the refrigerant flowing through a low-pressure-side channel 34b. The inflow terminal of the low-pressure side channel 34b is connected to a piping system between the receiver 33 and the liquid solenoid valve 41 via a capillary tube 36 and an economizer solenoid valve 42. The outflow terminal of the low-pressure-side channel 34b is connected to an intermediate suction port 11a of the compressor 11. The intermediate suction port 11a is connected at the middle of compression of the refrigerant (closer to the low-pressure side) in the compression mechanism of the compressor 11.

The suction proportional valve (suction regulating valve) 35 configures a flow rate regulating valve that regulates the amount of refrigerant circulating in the refrigerant circuit 10 by adjusting the amount of refrigerant suctioned into the compressor 11. At the time of capacity control in the chilling operation described hereinafter, the suction proportional valve 35 is controlled in such a manner that the temperature of air blown into the interior is kept within a range of, for example, ±0.5° C. of a predetermined temperature (set temperature) set by a user.

Specifically, at the time of capacity control in the chilling operation described hereinafter, the suction proportional valve 35 is controlled by the control unit 50 in such a manner that the opening of the suction proportional valve 35 becomes smaller as the temperature of the blown air becomes lower than the set temperature. In such a case where the temperature of the blown air is lower than the set temperature and the interior is excessively cold, the amount of refrigerant to be suctioned into the compressor 11 is reduced, as well as the heat exchanging capacity of the evaporator 14, to prevent the interior from being cooled excessively.

On the other hand, at the time of the capacity control in the chilling operation described hereinafter, the suction proportional valve 35 is controlled by the control unit 50 in such a manner that the opening of the suction proportional valve 35 becomes larger as the temperature of the blown air becomes higher than the set temperature. In such a case where the temperature of the blown air is higher than the set temperature and the interior needs to be cooled more, the amount of refrigerant to be suctioned into the compressor 11 is increased, as well as the heat exchanging capacity of the evaporator 14, to promote cooling of the interior.

A first defrosting pipe 23, a second defrosting pipe 24, a discharge gas bypass pipe 25, and a liquid injection pipe 26 are connected to the refrigerant circuit 10.

The first defrosting pipe 23 and the second defrosting pipe 24 configure a piping system for a defrosting operation, branching off from the discharge pipe 21 of the compressor 11 and introducing the refrigerant, which is discharged from the compressor 11, to the evaporator 14, to melt the frost attached to the evaporator 14. The first defrosting pipe 23 and the second defrosting pipe 24 each have an end connected between the check valve 31 and the discharge pressure regulating valve 32 and the other end connected between the expansion valve 13 and the evaporator 14.

The first defrosting pipe 23 is provided with a hot gas solenoid valve 43 that is opened during the defrosting operation. The second defrosting pipe 24 is provided with a defrosting solenoid valve 44 that is opened during the defrosting operation, and a drain pan heater 37. The drain pan heater 37 is installed inside a drain pan, not shown, to receive the frost and dew condensation water falling off of the surface of the evaporator 14 in the container. Therefore, when the refrigerant that is discharged from the compressor 11 during the defrosting operation flows through the drain pan heater 37, masses of frost and dew condensation water recovered in the drain pan absorb the heat of the refrigerant discharged from the compressor 11 and consequently melt.

The discharge gas bypass pipe 25 is a piping system that returns some of the refrigerant discharged from the compressor 11 to the suction side of the compressor 11 when the cooling capacity of the evaporator 14 becomes excessively high. The discharge gas bypass pipe 25 is also used as an oil return pipe for returning the refrigerating machine oil of the refrigerant discharged from the compressor 11 to the suction side of the compressor 11. The discharge gas bypass pipe 25 has one end connected between the check valve 31 and the defrosting solenoid valve 44 and the other end connected between the evaporator 14 and the suction proportional valve 35. The discharge gas bypass pipe 25 is provided with a discharge gas bypass solenoid valve 45 that is opened in accordance with a predetermined operational condition when the capacity control is performed during the chilling operation described hereinafter.

The liquid injection pipe 26 is a so-called liquid injection piping system for feeding the liquid refrigerant, condensed by the condenser 12, back to the suction side of the compressor 11. The liquid injection pipe 26 has one end connected between the receiver 33 and the liquid solenoid valve 41 and the other end connected between the suction proportional valve 35 and the compressor 11. The liquid injection pipe 26 is provided with an injection solenoid valve 46 that is opened in accordance with a predetermined operational condition when, for example, the capacity control is performed during the chilling operation described hereinafter.

The refrigeration device 1 is also provided with various sensors. A blow temperature sensor SS for detecting the temperature of the air blown toward the interior, and a suction temperature sensor RS for detecting the temperature of the interior air (suctioned air) sent to the evaporator 14, are provided in the vicinity of the evaporator 14. The inlet side of the evaporator 14 is provided with an evaporator inlet temperature sensor EIS for detecting the temperature of the refrigerant at the evaporator inlet. The outlet side of the evaporator 14 is provided with an evaporator outlet temperature sensor EOS for detecting the temperature of the refrigerant at the evaporator outlet. An outside air temperature sensor ES for detecting the temperature of the outside air is provided in the vicinity of the condenser 12.

The discharge pipe 21 of the compressor 11 is provided with a discharge temperature sensor DCHS for detecting the temperature of the refrigerant discharged from the compressor 11, and a high-pressure sensor HPT for detecting the pressure of the refrigerant discharged from the compressor 11. The suction pipe 22 of the compressor 11 is provided with a low-pressure sensor LPT for detecting the pressure of the refrigerant suctioned into the compressor 11.

The refrigeration device 1 also has the control unit 50 that is in charge of controlling the operations of the various parts of the refrigeration device 1. The control unit 50 is configured by a microcomputer equipped with, for example, a CPU and memories such as a ROM and a RAM, and controls the operations of the various parts of the device by causing the CPU to execute various control programs stored in the memories. For instance, the control unit 50 causes the CPU to execute the control programs functioning as an instruction receiving unit 51 and an operation control unit 52, to control the operation of the refrigerant circuit 10 based on the temperature of the blown air detected by the blow temperature sensor SS.

The instruction receiving unit 51 receives the input of various instructions concerning the operation of the refrigeration device 1, such as a target temperature (set temperature) of the interior, and an operation mode selection instruction, which are input by the user through a remote control or the like.

The operation control unit 52 switches between a freezing operation for cooling the interior to a set temperature (e.g., −20° C.) lower than zero degrees Celsius in the refrigerant circuit 10 to freeze the cargoes inside the container, a chilling operation for refrigerating the cargoes inside the container with a cooling capacity lower than that of the freezing operation, and a defrosting operation for melting the frost and dew condensation water that are recovered in the drain pan, not shown, and fall off of the surface of the evaporator 14. Only the chilling operation performed by the operation control unit 52 is described hereinafter in detail, and detailed descriptions of the freezing operation and defrosting operation are omitted.

Specifically, the operation control unit 52 carries out the chilling operation when, for example, the set temperature is higher (e.g., 10° C.) than a predetermined temperature (e.g., −10° C.). Note that the operation control unit 52 performs the freezing operation when, for example, the set temperature is lower (e.g., −20° C.) than the predetermined temperature (e.g., −10° C.).

When carrying out the chilling operation, the operation control unit 52 continuously operates the compressor 11 to cause the evaporator 14 to continuously cool the interior air. Note that, when carrying out the chilling operation, the operation control unit 52 keeps the liquid solenoid valve 41 open at all times and opens/closes the solenoid valves 42 to 46 according to the need. The operation control unit 52 also drives the exterior fan 15 and the interior fans 16a, 16b at predetermined rotational speeds.

When the chilling operation is performed in the refrigerant circuit 10, the refrigerant compressed by the compressor 11 flows into the condenser 12 through the discharge pipe 21. In the condenser 12, the refrigerant is condensed by releasing heat to the outside air. The refrigerant thereafter passes through the high-pressure side channel 34a of the economizer heat exchanger 34 through the receiver 33. Subsequently, the resultant liquid refrigerant is decompressed when passing through the expansion valve 13 and then flows into the evaporator 14. In the evaporator 14, the refrigerant absorbs the heat from the interior air and thereby evaporates. As a result, the interior is cooled. The refrigerant that has evaporated in the evaporator 14 passes through the suction proportional valve 35 and is thereby suctioned into the compressor 11.

The chilling operation has a plurality of operation modes. Specifically, the chilling operation has a hot cargo mode for cooling hot cargoes (cargoes with high thermal load), loads (cargoes) of durians or the like that emit gas in the interior of the container, and a normal cargo mode for cooling normal cargoes (cargoes with low thermal load) other than the hot cargoes. Switching between the hot cargo mode and the normal cargo mode (operation mode selection) may be performed by the user manually or by means of communication means. The operation modes that are selected by the user using a remote control or the like are set by being received by the instruction receiving unit 51.

Figure 2A:
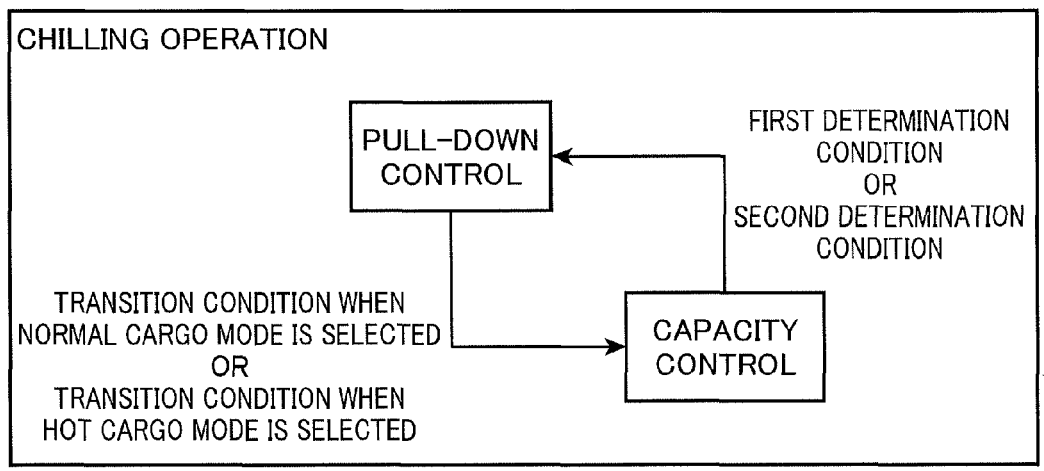
FIG. 2A shows that the operation control unit switches between pull-down control and capacity control.

As shown in FIG. 2A, in this chilling operation, the operation control unit 52 switches between pull-down control and capacity control, whether the operation mode is the normal cargo mode or the hot cargo mode.

The pull-down control regulates the opening of the expansion valve 13 in accordance with the outside air temperature detected by the outside air temperature sensor ES while fully opening the suction proportional valve 35, and rapidly cools the interior by driving the compressor 11.

The capacity control regulates the opening of the expansion valve 13 in accordance with the outside air temperature detected by the outside air temperature sensor ES, regulates the opening of the suction proportional valve 35 in accordance with the temperature of the blown air detected by the blow temperature sensor SS, cools the interior with a cooling capacity lower than that of the pull-down control by driving the compressor 11, and keeps the temperature of the interior at an optimal temperature state so that the temperature of the interior does not exceed a temperature range that is set with respect to the set temperature (e.g., ±0.5° C. of the set temperature), in other words, so that the temperature of the interior falls within this temperature range.

When a transition condition corresponding to the set operation mode is satisfied during the pull-down control, the operation control unit 52 switches from the pull-down control to the capacity control. In a case where a first determination condition or a second determination condition described hereinafter is satisfied, the operation control unit 52 switches from the capacity control to the pull-down control. Switching between the pull-down control and the capacity control by the operation control unit 52 is described hereinafter in detail.

Figure 2B:
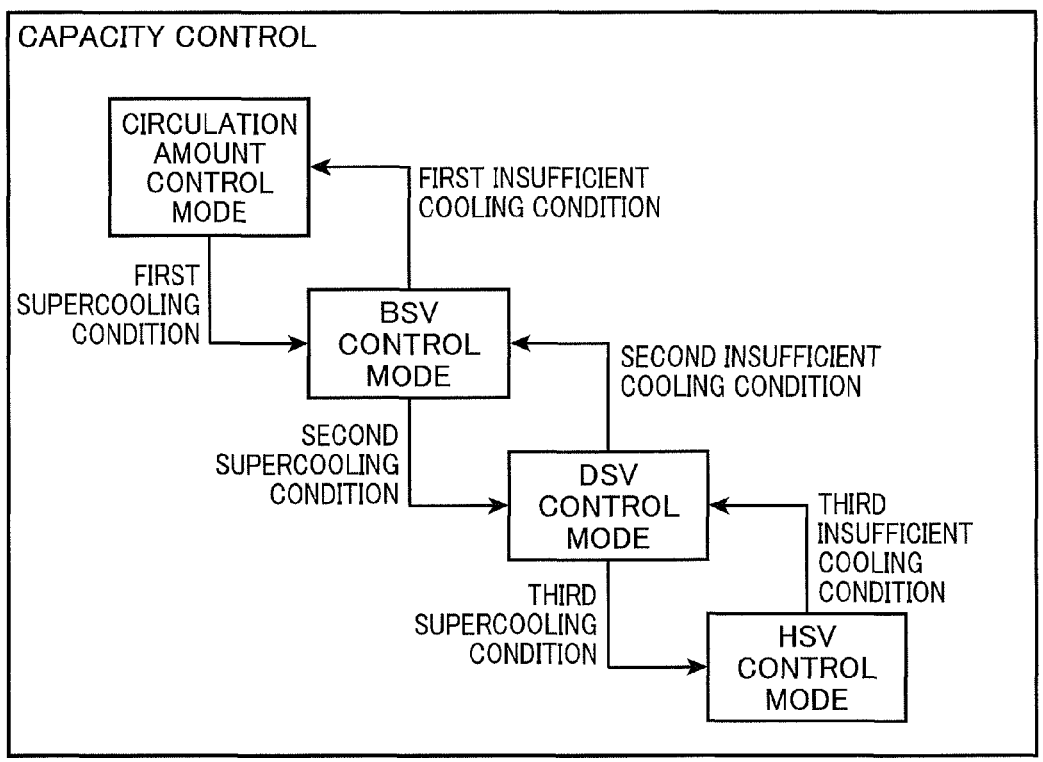
FIG. 2B shows that the operation control unit switches between a plurality of chilling modes for the capacity control.

As shown in FIG. 2B, the capacity control includes a plurality of chilling modes of different cooling capacities. Specifically, the chilling modes include a circulation amount control mode, a discharge gas bypass solenoid valve control mode (BSV control mode), a defrosting solenoid valve control mode (DSV control mode), and a hot gas solenoid valve control mode (HSV control mode). The operation control unit 52 switches between the plurality of chilling modes to execute the capacity control.

In the circulation amount control mode, the operation control unit 52 regulates the amount of refrigerant to be circulated in the refrigerant circuit 10, by regulating the opening of the suction proportional valve 35 in accordance with the temperature of the blown air. When the operation control unit 52 determines, during the circulation amount control mode, that the cooling capacity thereof is too high due to the fact that a first supercooling condition described below is satisfied by the refrigeration device 1, the operation control unit 52 changes the chilling mode to the BSV control mode.

In the BSV control mode, the operation control unit 52 lowers the cooling capacity by opening the discharge gas bypass solenoid valve 45 and returning some of the discharge gas of the compressor 11 to the suction side. When the temperature of the blown air rises, the operation control unit 52 increases the opening of the suction proportional valve 35 to increase the pressure of the refrigerant suctioned into the compressor 11.

When the operation control unit 52 determines, during the BSV control mode, that the cooling capacity thereof is too high due to the fact that a second supercooling condition described below is satisfied by the refrigeration device 1, the operation control unit 52 switches the chilling mode to the DSV control mode. On the other hand, when the operation control unit 52 determines, during the BSV control mode, that the cooling capacity thereof is too low due to the fact that a first insufficient cooling condition described hereinafter is satisfied by the refrigeration device 1, the operation control unit 52 switches the chilling mode to the circulation amount control mode.

In the DSV control mode, the operation control unit 52 keeps the temperature of the blown air constant by opening/closing the defrosting solenoid valve 44. More specifically, by opening the defrosting solenoid valve 44, the operation control unit 52 allows the high-temperature refrigerant to flow into the second defrosting pipe 24, increasing the temperature of the blown air to a predetermined temperature. After increasing the temperature of the blown air, the operation control unit 52 closes the defrosting solenoid valve 44 to prevent the temperature of the blown air from increasing. As mentioned before, normally the defrosting solenoid valve 44 is used to allow the high-temperature gas refrigerant, which is discharged from the compressor 11, to flow into the drain pan heater 37 in order to melt the masses of frost and dew condensation water recovered in the drain pan, not shown.

When the operation control unit 52 determines, during the DSV control mode, that the cooling capacity thereof is too high due to the fact that a third supercooling condition described hereinafter is satisfied by the refrigeration device 1, the operation control unit 52 switches the chilling mode to the HSV control mode. On the other hand, when the operation control unit 52 determines, during the DSV control mode, that the cooling capacity thereof is too low due to the fact that a second insufficient cooling condition described hereinafter is satisfied by the refrigeration device 1, the operation control unit 52 switches the chilling mode to the BSV control mode.

In the HSV control mode, the operation control unit 52 closes the expansion valve 13 (sets its opening at 0%) while fully opening the suction proportional valve 35, and opens the hot gas solenoid valve 43 to allow the high-temperature refrigerant to flow into the first defrosting pipe 23, thereby increasing the temperature of the blown air. As mentioned before, normally the hot gas solenoid valve 43 is used to perform hot gas defrosting in which the high-temperature gas refrigerant discharged from the compressor 11 is supplied to the evaporator 14 and circulated between the evaporator 14 and the compressor 11 during the defrosting operation.

When the operation control unit 52 determines, during the HSV control mode, that the cooling capacity thereof is too low due to the fact that a third insufficient cooling condition described below is satisfied by the refrigeration device 1, the operation control unit 52 switches the chilling mode to the DSV control mode.

How the operation control unit 52 switches between the pull-down control and the capacity control in the chilling operation is described hereinafter with reference to FIG. 3.

For example, in a case where the instruction receiving unit 51 receives the set temperature SP of the interior that is input by the user using a remote control or the like, and the received set temperature SP is higher (e.g., 10° C.) than a predetermined temperature (e.g., −10° C.), the operation control unit 52 begins the chilling operation. Once the chilling operation begins, the operation control unit 52 first cools the interior rapidly by performing the pull-down control (step S1).

In a case where the normal cargo mode is set as the operation mode (step S2; normal cargo mode), the operation control unit 52 continues with the pull-down control of step S1 as long as the temperature of the blown air detected by the blow temperature sensor SS is equal to or higher than the set temperature SP by a predetermined temperature ΔT (e.g., 1.5° C.) (step S3; NO).

However, when the hot cargo mode is set as the operation mode (step S2; hot cargo mode), the operation control unit 52 continues with the pull-down control of step S1 as long as the temperature of the blown air detected by the blow temperature sensor SS is equal to or higher than the set temperature SP (step S4; NO).

In a case where the normal cargo mode is set as the operation mode (step S2; normal cargo mode), when the temperature of the blown air detected by the blow temperature sensor SS falls below a temperature higher than the set temperature SP by the predetermined temperature ΔT (SP+ΔT) (step S3; YES), the operation control unit 52 stops the pull-down control and starts the capacity control. In other words, the operation control unit 52 switches the control of the chilling operation from the pull-down control to the capacity control (step S5).

In a case where the hot cargo mode is set as the operation mode (step S2; hot cargo mode), when the temperature of the blown air detected by the blow temperature sensor SS falls below the set temperature SP (step S4; YES), the operation control unit 52 switches the control of the chilling operation from the pull-down control to the capacity control (step S5). The capacity control is described hereinafter in detail.

Figure 4:
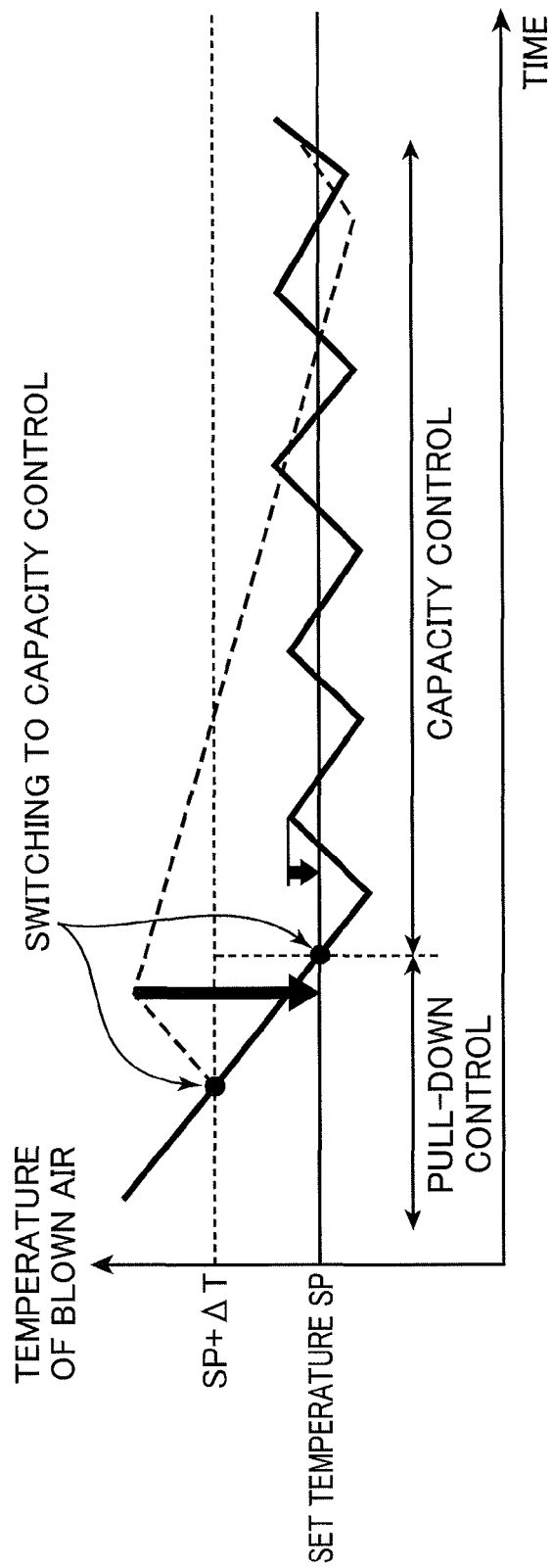
FIG. 4 is an explanatory diagram showing an example of chronological changes of the temperature of the interior that occur when the operation control unit switches from the pull-down control to the capacity control.

In other words, in the hot cargo mode, the pull-down control drops the temperature of the blown air to at least the set temperature (SP) as shown by, for example, the solid line graph in FIG. 4. Specifically, the temperature that is obtained at the initial stage of switching from the pull-down control to the capacity control becomes lower than that obtained when switching from the pull-down control to the capacity control as soon as the temperature of the blown air detected by the blow temperature sensor SS falls below the temperature higher than the set temperature SP by the predetermined temperature (SP+ΔT), as shown by the broken-line graph in FIG. 4, as with the technique described in Patent Literature 1 or the normal cargo mode.

For this reason, even when the temperature of the interior rises rapidly during the transition from the pull-down control to the capacity control, such as when a large number of hot cargoes are stored in the container, the range in which the capacity control lowers the temperature of the interior to the set temperature (SP) becomes narrower than that of the technique described in Patent Literature 1 or the normal cargo mode, as shown by the thick arrow in FIG. 4. As a result, the time it takes to reduce the temperature of the interior to the set temperature (SP) can be shortened.

Returning to FIG. 3, the operation control unit 52 continues with the capacity control when the temperature of the blown air is equal to or lower than a temperature that is higher than the set temperature SP by a predetermined temperature T2 (e.g., 5° C.) (SP+T2) (step S6; NO). Once the temperature of the blown air exceeds the temperature that is higher than the set temperature SP by the predetermined temperature T2 (SP+T2) (step S6; YES), the operation control unit 52 discontinues the capacity control and begins the pull-down control. In other words, the operation control unit 52 switches the control of the chilling operation from the capacity control to the pull-down control (step S1).

When a state in which the opening of the suction proportional valve 35 is greater than a predetermined initial opening AP0 (e.g., 50%) that is initialized when switching from the pull-down control to the capacity control (step S7; YES) and the temperature of the blown air exceeds a temperature that is higher than the set temperature SP by a predetermined temperature T1 (e.g., 1° C.) (SP+T1) lower than the predetermined temperature T2 (e.g., 5° C.) (step S8; YES) lasts for a predetermined period of time Td (e.g., 1 minute) or longer (step S9; YES), the operation control unit 52 determines that the temperature of the interior is excessively high due to, for example, the respiration heat of the hot cargoes and that the cooling capacity of the capacity control is no longer enough to cool the interior. The operation control unit 52 then stores (sets) a hot cargo determination flag indicating "YES" in the RAM (step S10). The operation control unit 52 then discontinues the capacity control and begins the pull-down control. In other words, the operation control unit 52 switches the control of the chilling operation from the capacity control to the pull-down control (step S1).

On the other hand, when the opening of the suction proportional valve 35 is 1) less than the predetermined initial opening AP0 (step S7; NO), 2) when the temperature of the blown air does not exceed the temperature that is higher than the set temperature SP by the predetermined temperature T1 (step S8; NO), or 3) when a state in which the opening of the suction proportional valve 35 is greater than the predetermined initial opening AP0 (e.g., 90%) (step S7; YES) and the temperature of the blown air exceeds the temperature that is higher than the set temperature SP by the predetermined temperature T1 (e.g., 1° C.) (step S8; YES) does not last for the predetermined period of time Td (step S9; NO), the operation control unit 52 continues with the capacity control (step S5).

In other words, steps S7, S8 and S9 configure an example of the first determination condition according to the present invention, which is a condition for switching from the capacity control to the pull-down control in the hot cargo mode, and step S6 configures an example of the second determination condition according to the present invention, which is a condition for switching from the capacity control to the pull-down control in the normal cargo mode.

Even when the result of the determination of step S6 is negative, the control of the chilling operation is switched to the pull-down control as long as the state in which the suction proportional valve 35 is opened at the initial opening AP0 or more (step S7; YES) and the temperature of the blown air is above the threshold (SP+T1) (step S8; YES) lasts for the predetermined period of time Td (step S9; YES).

Note that after the execution of step S5, the operation control unit 52 may simply perform step S7 and the processes subsequent thereto without executing step S6. The operation control unit 52 may also simply execute step S6 after the execution of step S5 and may not perform step S7 and the processes subsequent thereto. The operation control unit 52 may not execute step S6 and the processes subsequent thereto, after the execution of step S5.

The operation control unit 52 may not execute steps S2 and S3 and may execute step S4 after the execution of step S1. Furthermore, the operation control unit 52 may not execute step S6 and the processes subsequent thereto, after the execution of step S5.

How the operation control unit 52 switches between the plurality of chilling modes in the capacity control is now described hereinafter with reference to FIG. 5.

When starting the capacity control, the operation control unit 52 first determines whether the control of the chilling operation is to be switched to the capacity control for the first time or not (step S21). Whether there is stored in the RAM a switching flag that indicates that the pull-down control is switched to the capacity control, the operation control unit 52 determines whether switching to the capacity control is about take place for the first time or not.

When the operation control unit 52 determines in step S21 that switching to the capacity control is about to take place for the first time due to the absence of the switching flag in the RAM (step S21; YES), the operation control unit 52 stores, in the RAM, the switching flag indicating that the switching was performed (step S33). Thereafter, the operation control unit 52 determines whether the pressure of the refrigerant discharged from the compressor 11, which is detected by the high-pressure sensor HPT, falls within a predetermined range (e.g., 0 to 3000 kPa) and is less than a predetermined upper limit (e.g., 1500 kPa) (step S34).

Even when the operation control unit 52 determines that it is not the first time for the control of the chilling operation to be switched to the capacity control (step S21; NO), the operation control unit 52 executes step S34 when the hot cargo determination flag indicating "YES" is not stored in the RAM (step S22; NO).

When the operation control unit 52 determines in step S34 that the pressure of the refrigerant discharged from the compressor 11 that is detected by the high-pressure sensor HPT falls within the predetermined range and is less than the predetermined upper limit (step S34; YES), the operation control unit 52 begins the capacity control in the BSV control mode with a cooling capacity lower than that of the circulation amount control mode so that the temperature of the interior does not drop rapidly (step S25).

However, when the operation control unit 52 determines in step S34 that the pressure of the refrigerant discharged from the compressor 11 that is detected by the high-pressure sensor HPT does not fall within the predetermined range (e.g., 0 to 3000 kPa) or is equal to or greater than the predetermined upper limit (e.g., 1500 kPa) (step S34; NO), the operation control unit 52 begins the capacity control in the circulation amount control mode, the chilling mode with the highest cooling capacity, so that the cooling capacity does not drop below that of the pull-down control (step S23).

Even when the operation control unit 52 determines that it is not the first time for the control of the chilling operation to be switched to the capacity control (step S21; NO), the operation control unit 52 begins the capacity control in the circulation amount control mode (step S23) as long as the hot cargo determination flag indicating "YES" is stored in the RAM (step S22; YES).

When the first predetermined supercooling condition is satisfied during the capacity control performed in the circulation amount control mode (step S24; YES), the operation control unit 52 discontinues the capacity control in the circulation amount control mode and begins the capacity control in the BSV control mode. In other words, the operation control unit 52 changes the chilling mode from the circulation amount control mode to the BSV control mode (step S25).

As far as the first supercooling condition is concerned, for example, the following conditions are determined based on the test results of a test run and the like: 1) a state in which the temperature of the blown air is lower than the temperature obtained by subtracting 0.5° C. from the set temperature SP (SP−0.5° C.) lasts for 10 minutes; and 2) a state in which the temperature of the blown air is lower than the temperature obtained by subtracting 0.2° C. from the set temperature SP (SP−0.2° C.) lasts for 30 minutes.

When the first predetermined insufficient cooling condition is satisfied during the capacity control performed in the BSV control mode (step S26; YES), the operation control unit 52 discontinues the capacity control in the BSV control mode and begins the capacity control in the circulation amount control mode. In other words, the operation control unit 52 switches the chilling mode to the circulation amount control mode (step S23).

As far as the first insufficient cooling condition is concerned, for example, the following conditions are determined based on the test results of a test run and the like: 1) a state in which the temperature of the blown air is higher than the temperature obtained by adding 0.5° C. to the set temperature SP (SP|0.5° C.) lasts for 20 minutes; and 2) a state in which the temperature of the blown air is less than the temperature obtained by adding 1° C. to the set temperature SP (SP+1° C.) and the opening of the suction proportional valve 35 is greater than an opening determined in accordance with the set temperature SP (36% when the set temperature SP is less than −5° C., 29% when the set temperature SP is equal to or higher than −5° C. but less than −3° C., 21% when the set temperature SP is equal to or higher than −3° C.) when the pressure of the refrigerant detected by the high-pressure sensor HPT exceeds 900 kPa or when the set temperature SP is equal to or higher than −3° C. lasts for 5 minutes.

When the second predetermined supercooling condition is satisfied during the capacity control performed in the BSV control mode (step S27; YES), the operation control unit 52 discontinues the capacity control in the BSV control mode and begins the capacity control in the DSV control mode. In other words, the operation control unit 52 switches the chilling mode from the BSV control mode to the DSV control mode (step S28).

As far as the second supercooling condition is concerned, for example, the following conditions are determined based on the test results of a test run and the like: 1) a state in which the opening of the expansion valve 13 is equal to or less than 75%, the opening of the suction proportional valve 35 is less than 3%, and the temperature of the blown air is equal to or lower than the temperature obtained by subtracting 2° C. from the set temperature SP (SP−2° C.) lasts for 30 seconds; 2) a state in which the temperature difference obtained by subtracting the temperature of the refrigerant at the inlet of the evaporator 14 detected by the evaporator inlet temperature sensor EIS from the temperature of the refrigerant at the outlet of the evaporator 14 detected by the evaporator outlet temperature sensor EOS exceeds 5° C., or a state in which the temperature of the blown air is less than the temperature obtained by subtracting 0.5° C. from the set temperature SP (SP−0.5° C.) lasts for 10 minutes; and 3) a state in which the temperature of the blown air is lower than the temperature obtained by subtracting 0.2° C. from the set temperature SP (SP−0.2° C.) lasts for 30 minutes.

When the second predetermined insufficient cooling condition is satisfied during the capacity control performed in the DSV control mode (step S29; YES), the operation control unit 52 discontinues the capacity control in the DSV control mode and begins the capacity control in the BSV control mode. In other words, the operation control unit 52 switches the chilling mode to the BSV control mode (step S25).

As far as the second insufficient cooling condition is concerned, for example, the following conditions are determined based on the test results of a test run and the like: 1) a state in which the temperature of the blown air is higher than the temperature obtained by adding 0.5° C. to the set temperature SP (SP+0.5° C.) lasts for 10 minutes; 2) a state in which the temperature of the blown air is higher than the temperature obtained by adding 1° C. to the set temperature SP (SP+1° C.) lasts for 5 minutes; 3) when the set temperature SP is set at 13° C. or lower and the pressure of the refrigerant detected by the high-pressure sensor HPT exceeds 850 KPa or when the set temperature SP is higher than 13° C. and the pressure of the refrigerant detected by the high-pressure sensor HPT exceeds 1350 KPa, the defrosting solenoid valve 44 is opened, the temperature of the refrigerant discharged from the compressor 11 that is detected by the discharge temperature sensor DCHS is less than 100° C., the temperature of the blown air is higher than the set temperature SP, and the pressure of the refrigerant discharged from the compressor 11 that is detected by the high-pressure sensor HPT falls within the predetermined range (e.g., 0 to 3000 kPa); and 4) a state in which the set temperature SP is higher than 25° C. and the temperature of the blown air is higher than the temperature obtained by adding 0.6° C. to the set temperature SP (SP+0.6° C.) lasts for 3 hours.

When the third predetermined supercooling condition is satisfied during the capacity control performed in the DSV control mode (step S30; YES), the operation control unit 52 discontinues the capacity control in the DSV control mode and begins the capacity control in the HSV control mode. In other words, the operation control unit 52 switches the chilling mode from the DSV control mode to the HSV control mode (step S31).

As far as the third supercooling condition is concerned, for example, the following situations are determined based on the test results of a test run and the like: 1) a state in which the temperature of the blown air is less than the temperature obtained by subtracting 0.5° C. from the set temperature SP (SP−0.5° C.) lasts for 10 minutes; and 2) the temperature of the refrigerant discharged from the compressor 11, which is detected by the discharge temperature sensor DCHS, exceeds 105° C.

When the third predetermined insufficient cooling condition is satisfied during the capacity control performed in the HSV control mode (step S32; YES), the operation control unit 52 discontinues the capacity control in the HSV control mode and begins the capacity control in the DSV control mode. In other words, the operation control unit 52 switches the chilling mode to the DSV control mode (step S28).

As far as the third insufficient cooling condition is concerned, for example, the following situations are determined based on the test results of a test run and the like: 1) a state in which the temperature of the blown air exceeds the temperature obtained by adding 0.5° C. to the set temperature SP (SP+0.5° C.) lasts for 10 minutes; and 2) a state in which the temperature of the blown air exceeds the temperature obtained by adding 1° C. to the set temperature SP (SP+1° C.) lasts for 5 minutes.

According to the configuration of the foregoing embodiment, the transition condition for switching from the pull-down control to the capacity control in accordance with the set operation mode can be switched to step S3 or step S4. Therefore, for instance, when hot cargoes are stored in the container, the hot cargo mode is selected as the operation mode, and then the pull-down control is executed until the temperature of the blown air falls below the set temperature SP of the interior. Therefore, compared to when the normal cargo mode is set as the operation mode, the temperature of the interior that is obtained at the initial stage of switching from the pull-down control to the capacity control can be set low.

In other words, even when the temperature of the interior rises rapidly due to the respiration heat of the hot cargoes during the transition from the pull-down control to the capacity control, because the temperature of the interior that is obtained at the initial stage of switching from the pull-down control to the capacity control is lower than that obtained when setting the normal cargo mode as the operation mode, the possibility that it might take a long time for the temperature of the interior to reach the set temperature SP in the capacity control can be lowered.

In a case where cargoes other than hot cargoes are stored in the container, the normal cargo mode is set as the operation mode, and the pull-down control is performed until the temperature of the blown air falls below the temperature that is higher than the set temperature SP of the interior by the predetermined temperature ΔT. Therefore, the temperature of the interior that is obtained at the initial stage of switching from the pull-down control to the capacity control can be made higher than that obtained when the hot cargo mode is set as the operation mode.

In other words, compared to when the hot cargo mode is selected as the operation mode during the transition from the pull-down control to the capacity control, the possibility that the temperature of the interior becomes lower than the set temperature SP can be lowered, reducing the chance of damage caused by excessively cooling the cargoes.

In addition, it is possible that the cooling capacity of the capacity control is no longer enough to cool the interior when the interior cannot be cooled with the original cooling capacity due to, for example, frost deposits on the evaporator 14 and consequently the temperature of the blown air exceeds the temperature that is higher than the set temperature SP the second predetermined temperature T2. The foregoing embodiment, however, is configured to be able to appropriately determine in step S6 whether the cooling capacity of the capacity control is no longer enough to cool the interior.

For example, when there are no frost deposits on the evaporator 14 but the temperature of the interior rises due to the respiration heat of the hot cargoes during the capacity control, it means that the cooling capacity of the capacity control is not enough and that the opening of the suction regulating valve 35 is equal to or greater than the initial opening AP0 that is initialized when switching from the pull-down control to the capacity control. In other words, a situation in which the temperature of the blown air is higher than the temperature corresponding to the initial opening AP0 of the suction regulating valve 35 and the temperature of the blown air is not higher than the temperature obtained by adding the predetermined temperature T2 to the set temperature SP but is higher than the temperature obtained by adding the predetermined temperature T1 to the set temperature SP is considered to last longer than the estimated period of time Td. According to the configuration of the foregoing embodiment, whether the cooling capacity of the capacity control is insufficient or not can be determined appropriately during the capacity control by determining whether all of the steps S7 to S9 are satisfied or not.

The first predetermined temperature T1 used in step S6 is lower than the second predetermined temperature T2 used in step S8. Therefore, unlike when switching from the capacity control to the pull-down control by satisfying step S6, the capacity control can be switched to the pull-down control by satisfying all of the steps S7 to S9 while the temperature of the blown air is low, thereby lowering the possibility that the capacity control is prolonged.

Step S10 is performed after all the steps S7 to S9 are satisfied. In other words, when it is determined that the temperature of the interior rises due to the respiration heat of the hot cargoes and that the cooling capacity of the capacity control is no longer sufficient, step S22 begins the capacity control in the chilling mode with the maximum cooling capacity when switching from the pull-down control to the capacity control. As a result, compared to when the capacity control is started in a chilling mode with a cooling capacity less than the maximum cooling capacity, the possibility that the cooling capacity becomes insufficient can be lowered.

In a case where the control of the chilling operation is switched to the capacity control for the first time or step S10 is not executed without satisfying any of steps S7 to S9 when switching from the pull-down control to the capacity control, step S34 is performed to determine whether to start the capacity control in the circulation amount control mode with the maximum cooling capacity, in accordance with the pressure of the refrigerant at the discharge side of the compressor 11, or the capacity control in the BSV control mode with a cooling capacity lower than that of the circulation amount control mode, preventing the interior from being cooled excessively.

When the operation control unit 52 starts the capacity control in the circulation amount control mode in step S23, the opening of the suction proportional valve 35 may be set at a predetermined opening (e.g., 60%) that is greater than the predetermined initial opening AP0 (e.g., 50%) initialized when switching from the pull-down control to the capacity control.

According to such a configuration, when switching from the pull-down control to the capacity control to start the capacity control in the circulation amount control mode, the opening of the suction proportional valve 35 can be prevented from becoming equal to or less than the predetermined opening greater than the predetermined initial opening AP0. In other words, the amount of refrigerant to be suctioned into the compressor 11 can be increased more than when adjusting the opening of the suction proportional valve 35 to the predetermined initial opening AP0, enhancing the cooling capacity.

When starting the capacity control in the circulation amount control mode in step S23, when the opening of the expansion valve 13 is equal to or greater than the opening that is determined as the upper limit of the opening of the expansion valve 13 (e.g., 50%) in the capacity control, the operation control unit 52 may set the opening of the expansion valve 13 at an opening (e.g., 75%) greater than the predetermined initial opening (e.g., 35% to 50%) in accordance with the outside air temperature, to start the capacity control.

On the other hand, when the opening of the expansion valve 13 is less than the predetermined opening of the expansion valve 13 described above (e.g., 50%), that is, when the outside air temperature detected by the outside air temperature sensor ES is less than the temperature corresponding to the predetermined opening of the expansion valve 13 (e.g., 50%), the capacity control may be started without adjusting the opening of the expansion valve 13.

According to this configuration, when the pull-down control is switched to the capacity control to start the capacity control in the circulation amount control mode and the opening of the expansion valve 13 is equal to or greater than the upper limit of the opening of the expansion valve 13 in the capacity control, that is, when the outside air temperature is equal to or higher than the temperature corresponding to the upper limit of the opening of the expansion valve 13 and the cooling capacity needs to be improved, the amount of refrigerant flowing through the evaporator 14 can be increased more than when adjusting the opening of the expansion valve 13 to the initial opening corresponding to the outside air temperature, and consequently the cooling capacity can be enhanced.

Second Embodiment

The refrigeration device 1 according to a second embodiment is described next. FIG. 7 is a cross-sectional diagram showing a schematic configuration of the refrigeration device 1 according to the second embodiment. The refrigeration device 1 shown in FIG. 7 cools the interior of a container 6 which is used for marine transportation or the like, as with the first embodiment. The refrigeration device 1 shown in FIG. 7 has the refrigerant circuit 10 shown in FIG. 1.

As shown in FIG. 7, the refrigeration device 1 is provided so as to close the front opening portion of the rectangular box-shaped container 6. The front opening portion of the container 6 is provided with a main body wall 2 and a partition wall 5. The main body wall 2, made of heat insulating material, closes the opening portion that is fixed to the front opening portion of the container 6. The main body wall 2 includes an upper portion 3 and a lower portion 4, wherein the lower portion 4 configures a concave portion that is depressed more deeply toward the inside (the interior) than the upper portion 3. The partition wall 5, a plate-like member extending in the vertical direction, is provided closer to an interior S4 than the main body wall 2.

The lower portion 4 (the concave portion 4) of the main body wall 2 configures an outer space S1 on the outside of an interior S4. Furthermore, an inner upper space S2 is formed between the upper portion 3 of the main body wall 2 and the partition wall 5. An inner lower space S3 is formed between the lower portion 4 of the main body wall 2 and the partition wall 5. The compressor 11, the condenser 12, the exterior fan 15 and the like are disposed in the outer space S1. The evaporator 14, the interior fans 16a, 16b and the like are disposed in the inner upper space S2. Cargoes are stored in the interior S4 (a cargo compartment S4).

An inlet 5a is provided at the upper portion of the partition wall 5 to communicate the inner upper space S2 and the interior S4 with each other. An outlet 5b is provided in the lower portion of the partition wall 5 to communicate the inner lower space S3 and the interior S4 with each other. Operating the interior fans 16a, 16b allows the air of the interior S4 to flow into the inner upper space S2 through the inlet 5a, which is then sent to the evaporator 14. The suctioned air that is sent to the evaporator 14 is subjected to heat exchange with the refrigerant in the evaporator 14 and then blown into the interior S4 through the inner lower space S3 and the outlet 5b. The air blown into the interior S4 circulates through the interior S4 and enters the inner upper space S2 again through the inlet 5a. The arrows in FIG. 7 roughly show the flow of the air circulating through the interior S4; however, the flow of the air is not limited to this route shown by the arrows.

The suction temperature sensor RS is provided upstream of the evaporator 14 in the inner upper space S2 and detects the temperature of the air of the interior S4 that is sent to the evaporator 14 (the temperature of the suctioned air). The blow temperature sensor SS is provided in the vicinity of the outlet 5b in the inner lower space S3 and detects the temperature of the air blown into the interior S4 (the temperature of the blown air).

In the first embodiment described above, the control target value of the temperature of the blown air is a constant value (i.e., the set temperature SP) as shown in FIG. 4. The following second embodiment, on the other hand, is different from the first embodiment in that the control target value of the temperature of the blown air is corrected based on the temperature of the suctioned air. The second embodiment is also different from the first embodiment in that the rotational speed of the interior fans 16a, 16b is changed based on the temperature of the suctioned air. The rest of the configurations of the second embodiment, other than these configurations mentioned above, are the same as those of the first embodiment. The detailed descriptions of the configurations same as those of the first embodiment are omitted.

Figure 8:
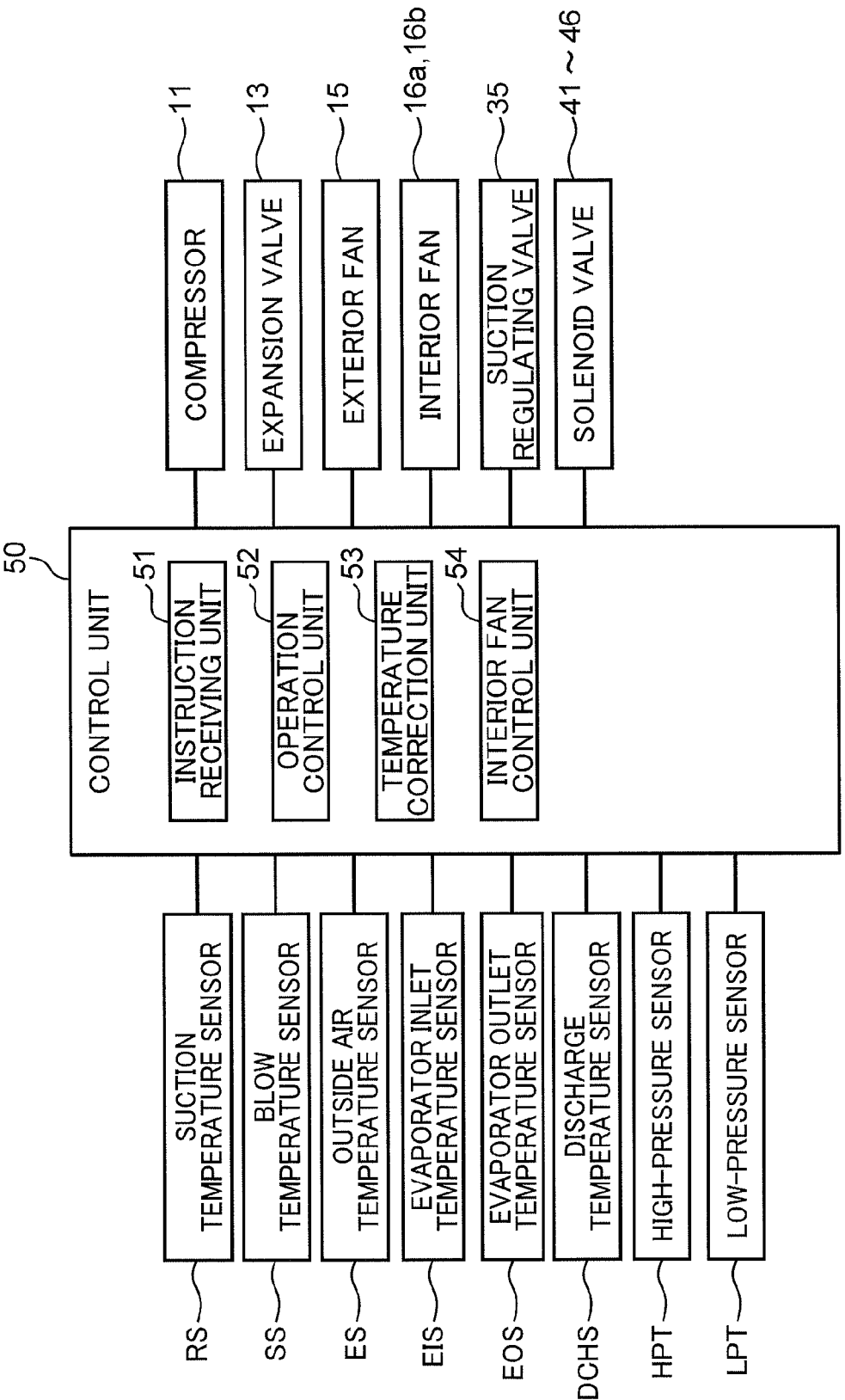
FIG. 8 is a block diagram showing schematic configurations of a control system and a primary mechanism of the refrigeration device.

FIG. 8 is a block diagram showing a schematic configuration of the control system and primary mechanism of the refrigeration device 1. As shown in FIG. 8, the control unit 50 controls the operations of the compressor 11, the expansion valve 13, the exterior fan 15, the interior fans 16a, 16b and the like based on the temperatures, pressures and the like detected by the various sensors.

As shown in FIG. 8, the control unit 50 of the refrigeration device 1 of the second embodiment has the same configuration as the control unit 50 of the first embodiment and functions as a temperature correction unit 53 and an interior fan control unit 54. The temperature correction unit 53 corrects the control target value of the temperature of the blown air in accordance with the temperature of the interior S4. The interior fan control unit 54 controls the rotational speed of the interior fans 16a, 16b that create flows of the suctioned air and blown air. In other words, the interior fan control unit 54 controls the air volumes of the interior fans 16a, 16b. The rotational speed of the interior fans 16a, 16b can be changed. The interior fan control unit 54 can select the rotational speed of the interior fans 16a, 16b from a plurality of different rotational speeds. In the present embodiment, the rotational speed of the interior fans 16a, 16b can be selected from high speeds and low speeds but may be selected from three or more different rotational speeds.

In the second embodiment, a plurality of control target values are defined as the control target value of the temperature of the blown air. The plurality of control target values are stored in, for example, a memory of the control unit 50, and the settings thereof can be changed by the user.

In the second embodiment, the control target value of the temperature of the blown air includes a first control target value, a second control target value, and a third control target value. The first control target value is the same as the target temperature (set temperature SP) of the interior S4 (e.g., 10° C.). The second control target value is provided to promote cooling of the interior S4 when the temperature of the suctioned air is high (i.e., when the temperature of the interior S4 is high), and is lower than the first control target value (e.g., 8° C.). The third control target value is provided to increase the control target value in stages when the second control target value is changed back to the first control target value, and is lower than the first control target value but greater than the second control target value (e.g., 9° C.). Note that specific numerical values of these control target values are merely exemplary and are not limited to those numerical values mentioned above.

In the second embodiment, a reference value used for correcting the control target value of the temperature of the blown air and a reference value used for changing the rotational speed of the interior fans 16a, 16b, are defined. These reference values are stored in, for example, the memory of the control unit 50 and can be changed by the user.

In the second embodiment, the reference value used for correcting the control target value of the temperature of the blown air includes a first reference value and a second reference value. The reference value used for changing the rotational speed of the interior fans 16a, 16b includes a third reference value and a fourth reference value. The first reference value is a value for determining whether the interior S4 is not cooled enough, and is greater than the target temperature of the interior S4 (set temperature SP) (e.g., 12° C.). The second reference value is a value for determining whether the problem concerning insufficient cooling of the interior S4 is resolved or not, and is lower than the first reference value (e.g., 11° C.). The third reference value is a value for determining whether the interior S4 is excessively cooled or not, and is lower than the second reference value (e.g., 10.5° C.). The fourth reference value is a value for determining whether the interior S4 is not cooled enough again after the problem concerning insufficient cooling of the interior S4 is resolved, and is greater than the first reference value (e.g., 13° C.). Specific numerical values of these reference values are merely exemplary and are not limited to those numerical values mentioned above.

Figure 9:
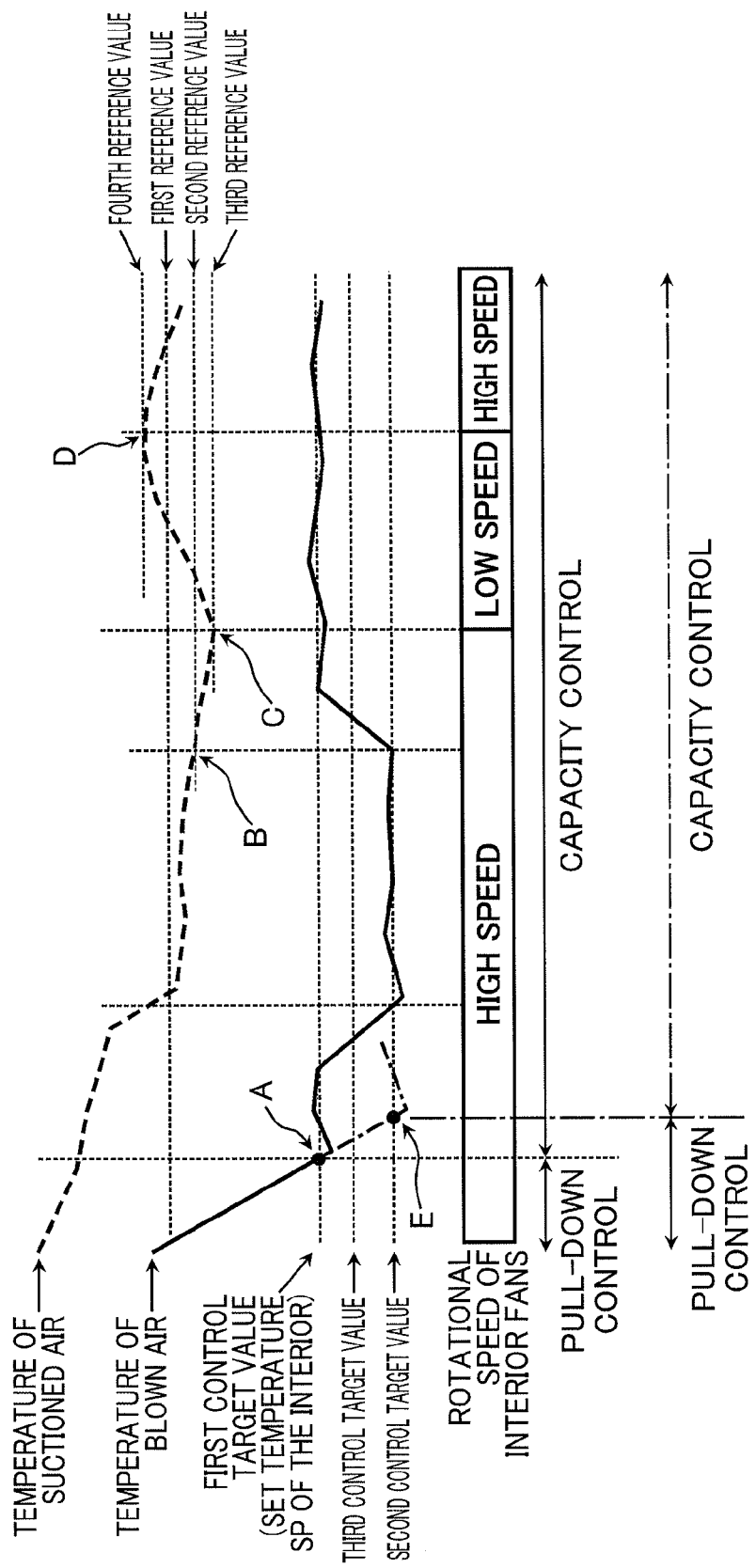
FIG. 9 is an explanatory diagram showing an example of chronological changes of the temperature of blown air and the temperature of suctioned air that occur when the operation control unit switches from the pull-down control to the capacity control, and an example of controlling the rotational speed of an interior fan.
Figure 10:
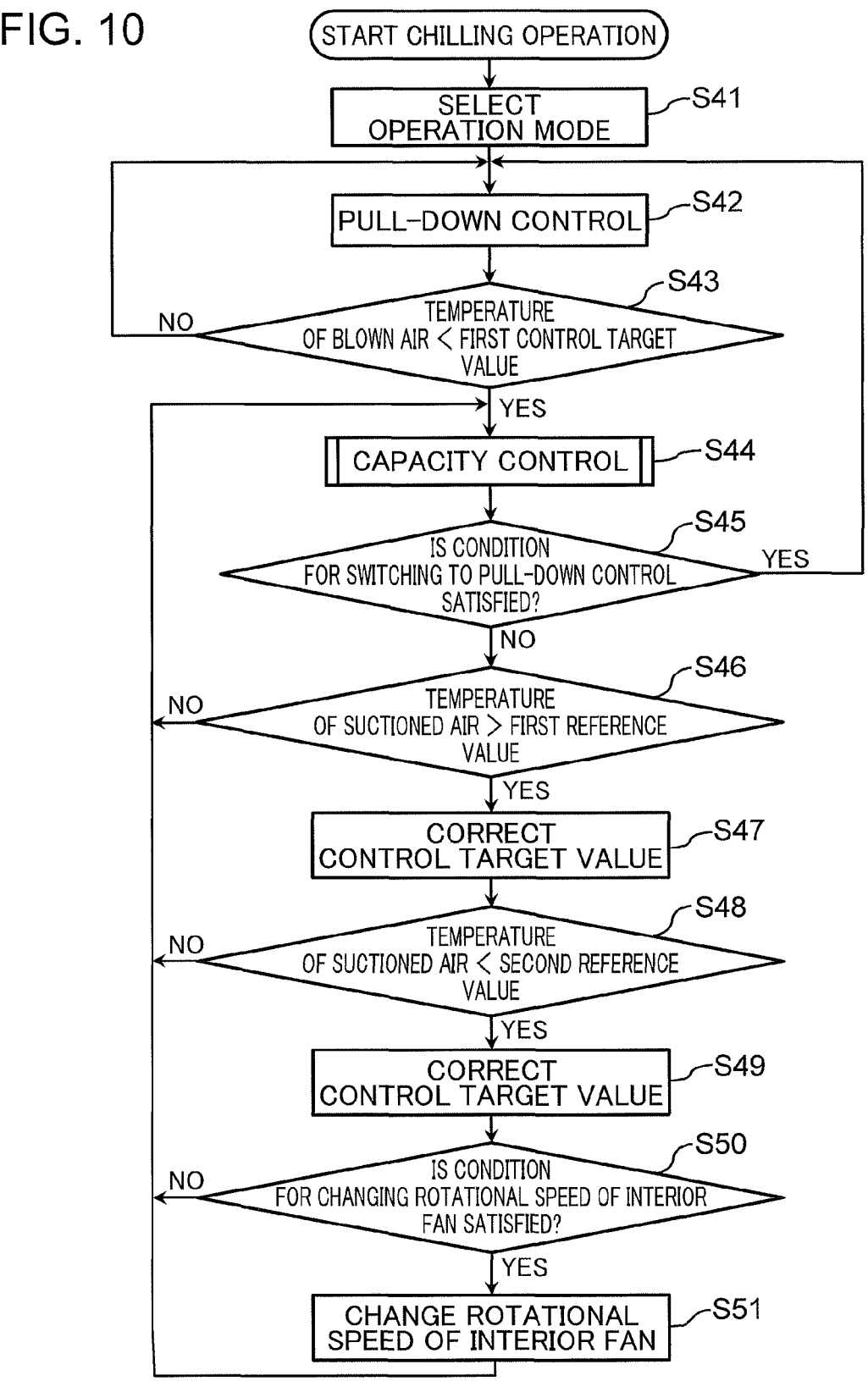
FIG. 10 is a flowchart showing an example of a flow in which the operation control unit switches between the pull-down control and the capacity control during the chilling operation.

FIG. 9 is an explanatory diagram showing an example of switching from the pull-down control to the capacity control of the chilling operation, the switching being performed by the operation control unit 52. FIG. 9 shows an example of chronological changes of the temperature of the blown air and the temperature of the suctioned air that occur when this switching takes place, and an example of controlling the rotational speed of the interior fans 16a, 16b. In FIG. 9, the zigzag solid line represents the chronological changes of the temperature of the blown air, and the zigzag broken line shows the chronological changes of the temperature of the suctioned air. FIG. 10 is a flowchart showing an example of a flow in which the operation control unit 52 switches between the pull-down control and the capacity control during the chilling operation. A control example according to the second embodiment is described specifically hereinafter with reference to FIGS. 9 and 10.

In the control example according to the second embodiment, as shown in FIGS. 9 and 10, when, for example, the same conditions as those of the control example of the first embodiment shown in FIG. 3 are satisfied, the operation control unit 52 begins the chilling operation. When the chilling operation is started, first, an operation mode is selected (step S41). In the control example shown in FIGS. 9 and 10, selecting the settings for hot cargoes with high thermal load (i.e., the hot cargo mode) is described as an example. For example, selecting an operation mode may be performed in the same way as in the control example shown in FIG. 3 or may be performed manually by the user or by means of communication means.

Once an operation mode is selected, the operation control unit 52 first performs the pull-down control to rapidly cool the interior S4 (step S42). The operation control unit 52 performs the pull-down control until the temperature of the air blown toward the interior S4 reaches at least the set temperature SP (the first control target value). When the temperature of the blown air detected by the blow temperature sensor SS reaches, for example, the point A shown in FIG. 9 and falls below the first control target value (step S43; YES), the operation control unit 52 switches the control of the chilling operation from the pull-down control to the capacity control (step S44). The capacity control is the same as the control described in the first embodiment with reference to FIG. 5; thus, the detailed explanation thereof is omitted.

Next, the operation control unit 52 determines whether a condition for switching to the pull-down control is satisfied in the capacity control (step S45). For example, the same switching condition as that of the control according to the first embodiment shown in FIG. 3 can be used as the condition for switching to the pull-down control; however, the condition is not limited thereto. Specifically, in the second embodiment, the operation control unit 52 can determine, in step S45, whether the condition for switching from the capacity control to the pull-down control is satisfied or not based on the same condition as the switching condition corresponding to steps S6 to S9 shown in FIG. 3. In the second embodiment as well, in step S45 shown in FIG. 10, the operation control unit 52 can use a simplified switching condition for performing the same process as step S6 without performing the processes of steps S7 to S9.

When the condition for switching to the pull-down control is satisfied (step S45; YES), the operation control unit 52 discontinues the capacity control and begins the pull-down control. In other words, the operation control unit 52 switches the control of the chilling operation from the capacity control to the pull-down control (step S42). However, when the condition for switching to the pull-down control is not satisfied (step S45; NO), the operation control unit 52 continues with the capacity control.

In the second embodiment, the decrease in the temperature of the blown air to the first control target value is not enough of a reference to determine that the temperature of the interior S4 has dropped significantly, and for this reason the temperature of the suctioned air is referenced as well. In other words, when, for example, a large number of hot cargoes with high thermal load are stored in the interior S4 of a large volume as shown in FIG. 7, sometimes the interior S4 is not cooled sufficiently due to the gas emitted from the hot cargoes, even if the temperature of the blown air has dropped to the first control target value.

Therefore, in the second embodiment, when the temperature of the blown air drops to the first control target value and the temperature of the suctioned air is higher than the first reference value (step S46; YES), it is determined that the interior S4 is not yet cool enough. Therefore, the temperature correction unit 53 corrects the control target value of the temperature of the blown air from the first control target value to the second control target value (step S47). Accordingly, the operation control unit 52 controls the refrigerant circuit 10 in such a manner that the temperature of the blown air reaches the second control target value.

However, when the temperature of the blown air drops to the first control target value and the temperature of the suctioned air is equal to or lower than the first reference value (step S46; NO), the control target value is not corrected, and the capacity control is continued (step S44).

Once the control target value is corrected to the second control target value, the interior S4 is further cooled, and the temperature of the suctioned air is further reduced as the temperature of the blown air becomes closer to the second control target value. When the temperature of the suctioned air becomes lower than the second reference value, it is determined that the problem concerning insufficient cooling of the interior is resolved. Specifically, when the temperature of the suctioned air reaches, for example, the value indicated by the point B in FIG. 9 and becomes lower than the second reference value (step S48; YES), the temperature correction unit 53 corrects the control target value to the first control target value (step S49).

On the other hand, when the temperature of the suctioned air is equal to or higher than the second reference value (step S48; NO), the control target value is not corrected, and the capacity control is continued (step S44).

In step S49, it is preferred that the control target value be increased in stages from the second control target value to the first control target value. Specifically, for example, in the control example shown in FIG. 9, the control target value is increased from the second control target value to the third control target value. When a predetermined correction condition is satisfied, the control target value is increased from the third control target value to the first control target value. Examples of the predetermined correction condition include a condition that a predetermined amount of time elapses since the control target value is increased to the third control target value; however, the predetermined correction condition is not limited thereto. Increasing the control target value in this step-by-step manner can prevent an increase in the temperature of the interior S4, minimizing the impact of a temperature change to the cargoes. Specifically, increasing the control target value in step-by-step manner can prevent generation of condensation in the cargoes (e.g., precision apparatuses) that occurs due to a temperature change.

In addition to correcting the control target value to the first control target value by means of the temperature correction unit 53, reduction of the rotational speed of the interior fans 16a, 16b may be performed by the interior fan control unit 54 in step S49.

Next, the operation control unit 52 determines whether the condition for changing the rotational speed of the interior fans 16a, 16b is satisfied or not (step S50). Specifically, when the temperature of the suctioned air reaches, for example, the point C shown in FIG. 9 and is lower than the third reference value (step S50; YES), the interior fan control unit 54 controls the interior fans 16a, 16b so that the rotational speed of the interior fans 16a, 16b drops (step S51). Specifically, in the present embodiment, the rotational speed of the interior fans 16a, 16b is set at a low speed. As a result, the interior air volume can be lowered, easing the cooling of the interior S4 and reducing power consumption. Even when the temperature of the suctioned air becomes lower than the third reference value, as long as the rotational speed of the interior fans 16a, 16b is the lower limit at the time, the rotational speed of the interior fans 16a, 16b is not changed.

When the temperature of the suctioned air reaches, for example, the point D shown in FIG. 9 and becomes higher than the fourth reference value (step S50; YES), the interior fan control unit 54 controls the interior fans 16a, 16b in such a manner that the rotational speed of the interior fans 16a, 16b increases (step S51). Specifically, in the present embodiment, the rotational speed of the interior fans 16a, 16b is set at a high speed. As a result, the interior air volume can be increased, and thereby the entire interior S4 can be cooled again. Even when the temperature of the suctioned air becomes higher than the fourth reference value, as long as the rotational speed of the interior fans 16a, 16b is the upper limit at the time, the rotational speed of the interior fans 16a, 16b is not changed.

When the temperature of the suctioned air is equal to or higher than the third reference value and equal to or lower than the fourth reference value (step S50; NO), the capacity control is continued without changing the rotational speed of the interior fans 16a, 16b (step S44).

The condition for changing the rotational speed in step S50 preferably includes a condition based on the third reference value and the fourth reference value and a condition that the temperature of the blown air falls within the range of the first control target value (set temperature SP). Because a condition that the temperature of the interior S4 (the temperature of the blown air) is stable in the vicinity of the first control target value (set temperature SP) is included as a part of the condition for changing the rotational speed, temperature fluctuations that are caused as a result of changing the rotational speed of the interior fans 16a, 16b can be reduced.

In the capacity control, the refrigerant circuit 10 is controlled in such a manner that, for example, the temperature of the blown air falls within a temperature range determined with respect to the first control target value (e.g., ±0.5° C. of the first control target value). Therefore, a favorable condition for increasing the rotational speed in step S50 includes a condition that the temperature of the suctioned air is lower than the third reference value and the temperature of the blown air falls within the temperature range determined with respect to the first control target value. Furthermore, a favorable condition for lowering the rotational speed in step S50 includes a condition that the temperature of the suctioned air is higher than the fourth reference value and the temperature of the blown air falls within the temperature range determined with respect to the first control target value.

The control example shown in FIGS. 9 and 10 illustrates a case in which the operation control unit 52 switches from the pull-down control to the capacity control when the temperature of the blown air reaches the point A shown in FIG. 9 and falls below the first control target value (set temperature SP). However, not only this control but also control shown by the following modification may be performed.

In this modification, when the temperature of the blown air shown by the solid line reaches the point A shown in FIG. 9 and falls below the first control target value (set temperature SP) in the pull-down control, steps S46 and S47 shown in FIG. 10 are executed while continuing the pull-down control as shown by the zigzag chain line. In this modification, when the temperature of the blown air drops to the first control target value and the temperature of the suctioned air is higher than the first reference value (step S46; YES), the temperature correction unit 53 corrects the control target value of the temperature of the blown air from the first control target value to the second control target value (step S47). Then, the operation control unit 52 continues with the pull-down control to control the refrigerant circuit 10 in such a manner that the temperature of the blown air reaches the second control target value. When the temperature of the blown air shown by the chain line reaches the point E shown in FIG. 9 and falls below the second control target value, the operation control unit 52 switches from the pull-down control to the capacity control, and the temperature correction unit 53 corrects the control target value to the first control target value (step S49).

Third Embodiment

The refrigeration device 1 according to a third embodiment is described next. The refrigeration device 1 according to the third embodiment has the refrigerant circuit 10 shown in FIG. 1. The first embodiment has illustrated a case in which the amount of refrigerant circulating in the refrigerant circuit 10 is adjusted by causing the suction proportional value (suction regulating valve) 35 to adjust the amount of refrigerant suctioned into the compressor 11. In the third embodiment, on the other hand, the amount of refrigerant circulating in the refrigerant circuit 10 is adjusted mainly by controlling the volume of the refrigerant in the compressor 11 and adjusting the flow rate of the refrigerant discharged from the compressor 11.

In the third embodiment, therefore, the suction proportional valve (suction regulating valve) 35 shown in FIG. 1 can be omitted. However, in the third embodiment, the amount of refrigerant circulating in the refrigerant circuit 10 may be adjusted by controlling the volume of the refrigerant in the compressor 11 and causing the suction proportional valve (suction regulating valve) 35 to adjust the amount of refrigerant suctioned into the compressor 11.

When the suction proportional valve (suction regulating valve) 35 is omitted in the third embodiment, the pull-down control drives the compressor 11 while regulating the opening of the expansion valve 13 in accordance with the outside air temperature detected by the outside air temperature sensor ES, thereby rapidly cooling the interior.

Also when the suction proportional valve (suction regulating valve) 35 is omitted in the third embodiment, the capacity control regulates the opening of the expansion valve 13 in accordance with the outside air temperature detected by the outside air temperature sensor ES and controlling the volume of the refrigerant in the compressor 11 in accordance with the temperature of the blown air detected by the blow temperature sensor SS, thereby cooling the interior with the cooling capacity lower than that of the pull-down control, and keeping the temperature of the interior at an optimal temperature within a range determined with respect to the set temperature (e.g., ±0.5° C. of the set temperature).

More specifically, during the capacity control, the compressor 11 is controlled in such a manner that the operational capacity of the compressor 11 drops as the temperature of the blown air becomes lower than the set temperature SP. Thus, when the temperature of the blown air is lower than the set temperature and therefore the interior is cooled excessively, the amount of refrigerant circulating in the refrigerant circuit 10 can be reduced to lower the heat exchanging capacity of the evaporator 14, preventing the interior from being cooled excessively.

On the other hand, during the capacity control, the compressor 11 is controlled in such a manner that the operational capacity of the compressor 11 increases as the temperature of the blown air becomes higher than the set temperature SP. Thus, when the temperature of the blown air is higher than the set temperature but the interior needs to be further cooled, the amount of refrigerant circulating in the refrigerant circuit 10 is increased to enhance the heat exchanging capacity of the evaporator 14, promoting cooling of the interior.

For example, when the compressor 11 is an inverter-driven variable capacity compressor, the operational capacity of the compressor 11 can be controlled by regulating the frequency of the motor (motor speed) of the compressor 11. In other words, the motor of the compressor 11 is supplied with power through an inverter, not shown. Changing the frequency of the AC supplied from the inverter to the motor (i.e., the operational frequency of the compressor 11) changes the rotational speed of the motor and consequently changes the operational capacity of the compressor 11. In addition, when, for example, the compressor 11 is a fixed capacity-type compressor in which the rotational speed of its motor is constant, the operational capacity of the compressor 11 can be controlled by intermittently operating the motor of the compressor 11.

In the third embodiment, the same control as that of the first embodiment shown in FIGS. 2 to 5 can be performed, as well as the same control as that of the second embodiment shown in FIGS. 9 and 10. The differences between the third embodiment and the first embodiment are simply described hereinafter using the control shown in FIG. 3 and the control example shown in FIG. 5.

As to the control shown in FIG. 3, step S7 of the first embodiment makes a determination under the condition that the opening of the suction regulating valve 35 is greater than the predetermined initial opening AP0. According to the third embodiment, on the other hand, step S7 shown in FIG. 3 makes a determination under the condition that the operational capacity of the compressor is greater than a predetermined operational capacity. Examples of the predetermined operational capacity include a predetermined frequency of AC supplied from the inverter to the motor (i.e., a predetermined operational frequency of the compressor 11). Note in the third embodiment that the rest of the steps shown in FIG. 3 are the same as those of the first embodiment; thus, the detailed descriptions thereof are omitted.

Figure 5:
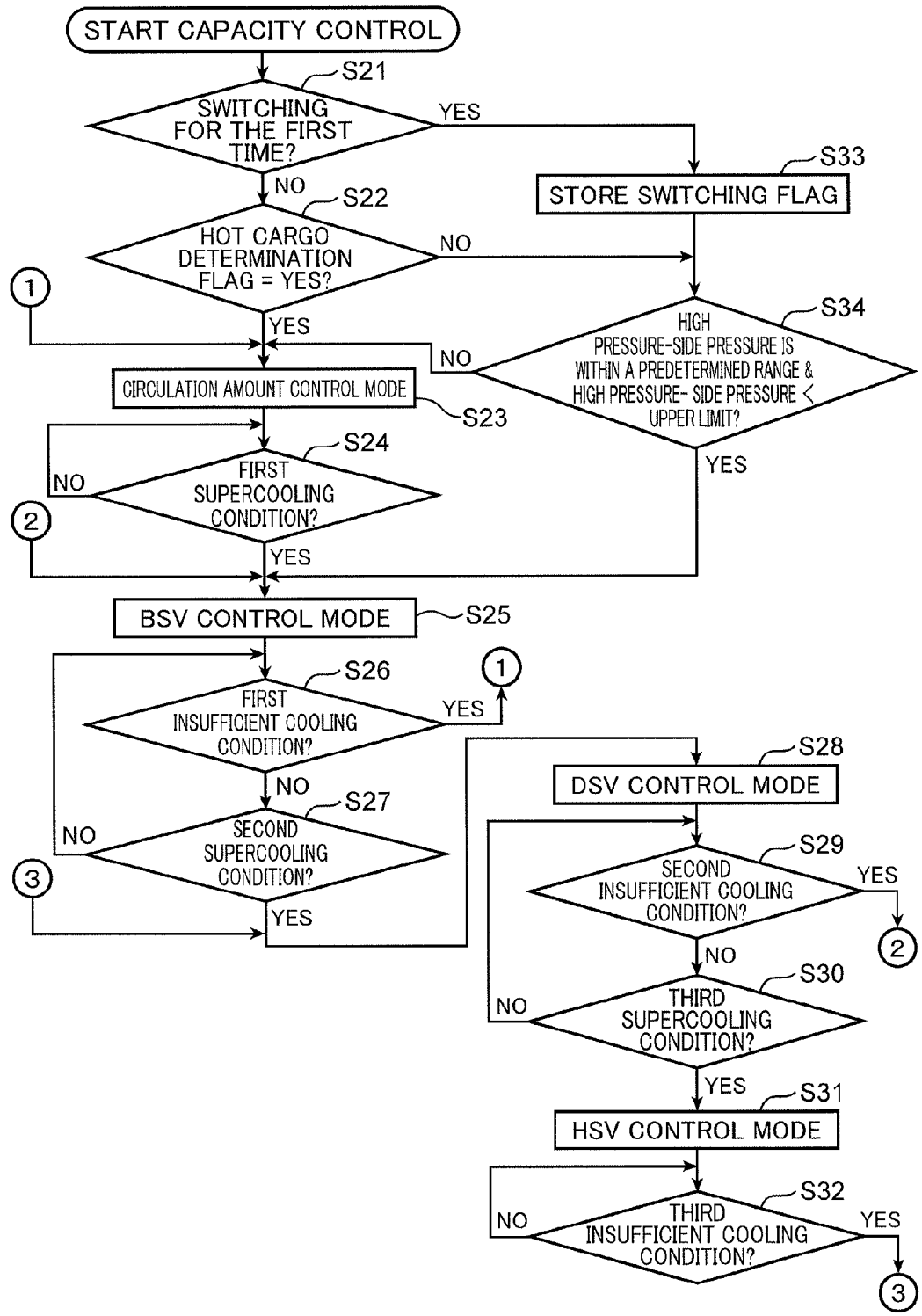
FIG. 5 is a flowchart showing an example of a flow in which the operation control unit switches between the plurality of chilling modes for the capacity control.

As to the control shown in FIG. 5, in the first embodiment, when starting the capacity control in the circulation amount control mode in step S23, the capacity control is started by setting the opening of the suction proportional valve 35 at a predetermined opening greater than the initial opening AP0. In the third embodiment, on the other hand, when starting the capacity control in the circulation amount control mode in step S23 shown in FIG. 5, the capacity control is started by setting the operational capacity of the compressor 11 at a predetermined operational capacity greater than the predetermined operational capacity that is initialized when switching from the pull-down control to the capacity control. Note in the third embodiment that the rest of the steps shown in FIG. 5 are the same as those of the first embodiment; thus, the detailed descriptions thereof are omitted.

The above has described the embodiments of the refrigeration device according to the present invention. However, the refrigeration device according to the present invention is not limited to the foregoing embodiments, and various changes, improvements and the like can be made without departing from the spirit of the present invention.

For instance, the foregoing embodiments have each described, using FIG. 5, a configuration in which the capacity control has a plurality of chilling modes (the circulation amount control mode, the BSV control mode, the DSV control mode, and the HSV control mode). However, in place of this configuration, when the capacity control has only one chilling mode, steps S24 to S32 of FIG. 5 may be omitted, and step S23 may be executed regardless of the conditions of steps S21, S22 and S34. Step S23 is configured to execute the only one chilling mode in place of the circulation amount control mode, i.e., the chilling mode with the maximum cooling capacity.

The second embodiment has described a configuration that includes both control for correcting the control target value of the temperature of the blown air based on the temperature of the suctioned air and control for changing the rotational speed of the interior fans 16a, 16b based on the temperature of the suctioned air; however, the configuration of the second embodiment is not limited thereto. In the second embodiment, control for correcting the control target value of the temperature of the blown air based on the temperature of the suctioned air may be executed but control for changing the rotational speed of the interior fans 16a, 16b based on the temperature of the suctioned air can be omitted.

The foregoing embodiments have each described an example in which the refrigeration device 1 cools the interior of a container which is used for a marine transportation or the like, however, the use of the refrigeration device 1 is not limited to this. The refrigeration device 1 can also be used to cool the interior of a warehouse, for example.

The configurations and processes shown in FIGS. 1 to 10 are merely exemplary to illustrate the embodiments of the present invention and are not intended to limit the present invention thereto.

SUMMARY OF THE EMBODIMENTS

The refrigeration device (1) is a refrigeration device (1) that executes a chilling operation for cooling an interior so that the temperature of the interior reaches a set temperature (SP) that falls within a predetermined temperature range. The refrigeration device (1) has an operation control unit (52) that switches between pull-down control and capacity control for cooling the interior with a cooling capacity lower than that of the pull-down control in the chilling operation, wherein the operation control unit (52) performs the pull-down control until the temperature of air blown toward the interior reaches the set temperature (SP).

According to this configuration, the pull-down control lowers the temperature of the blown air to at least the set temperature (SP). In other words, the temperature of the interior that is obtained at the initial stage of switching from the pull-down control to the capacity control is lower, as compared to when switching from the pull-down control to the capacity control at the point of time when the temperature of blown air falls below a temperature that is higher than the set temperature (SP) by a predetermined temperature, as in the technique described in Patent Literature 1.

Thus, even when the temperature of the interior rises rapidly during the transition from the pull-down control to the capacity control due to, for example, a large number of hot cargoes stored in the interior, the temperature range in which the temperature of the interior is dropped to the set temperature (SP) is reduced by the capacity control, shortening the time it takes to lower the temperature of the interior to the set temperature (SP), as compared to the technique described in Patent Literature 1.

The refrigeration device may further have an expansion valve (13) for regulating the amount of refrigerant flowing to an interior heat exchanger (14), and a suction regulating valve (35) for regulating the amount of refrigerant suctioned into the compressor (11). A hot cargo mode for cooling a hot cargo and a normal cargo mode for cooling a normal cargo other than a hot cargo may be previously set as operation modes for the chilling operation. In the pull-down control, the operation control unit (52) may regulate the opening of the expansion valve (13) in accordance with the outside air temperature and drive the compressor (11) with the suction regulating valve (35) fully opened. In the capacity control, the operation control unit (52) may regulate the opening of the expansion valve (13) in accordance with the outside air temperature and drive the compressor (11) while regulating the opening of the suction regulating valve (35) in accordance with the temperature of the blown air. When the temperature of the blown air falls below the set temperature (SP) during the pull-down control, with the hot cargo mode being selected as the operation mode, the operation control unit (52) may switch from the pull-down control to the capacity control. When the temperature of the blown air falls below a temperature that is higher than the set temperature (SP) by a predetermined temperature ($\Delta T$) during the pull-down control, with the normal cargo mode being selected as the operation mode, the operation control unit (52) may switch from the pull-down control to the capacity control.

According to this configuration, the transition condition for switching from the pull-down control to the capacity control can be changed depending on the selected operation mode.

For instance, the temperature condition for switching from the pull-down control to the capacity control might be set low just in case where the temperature of the interior rises rapidly during the transition from the pull-down control to the capacity control due to, for example, a large number of hot cargoes stored in the interior. In this case, however, when normal cargoes are stored in the interior instead of the hot cargoes, there is a possibility that the cargoes are cooled down excessively and consequently damaged as a result of a decrease in the temperature of the interior to a temperature lower than the set temperature (undershoot) during the transition from the pull-down control to the capacity control, as shown in, for example, FIG. 6B.

However, the transition condition for switching from the pull-down control to the capacity control can be changed in accordance with the operation mode. As a result, when, for example, hot cargoes are stored in the interior, the hot cargo mode can be selected as the operation mode, and in this mode the pull-down control is performed until the temperature of the blown air falls below the set temperature (SP) of the interior, whereby the temperature of the interior at the initial stage of switching from the pull-down control to the capacity control can be lowered more than when the normal cargo mode is selected as the operation mode.

In other words, even when the temperature of the interior rises rapidly due to the respiration heat of the hot cargoes during the transition from the pull-down control to the capacity control, the temperature of the interior at the initial stage of switching from the pull-down control to the capacity control is lower than when the normal cargo mode is selected as the operation mode. Therefore, the possibility that it might take a long time for the temperature of the interior to reach the set temperature (SP) in the capacity control can be lowered.

When cargoes other than hot cargoes are stored in the interior, the pull-down control is performed until the temperature of the blown air falls below a temperature higher than the set temperature (SP) of the interior by the predetermined temperature ($\Delta T$), with the normal cargo mode being selected as the operation mode. As a result, the temperature of the interior at the initial stage of switching from the pull-down control to the capacity control can be increased more than when the hot cargo mode is selected as the operation mode.

In other words, compared to when the hot cargo mode is selected as the operation mode, the possibility that the temperature of the interior becomes lower than the set temperature (SP) during the transition from the pull-down control to the capacity control can be reduced, preventing the cargoes from being cooled excessively and consequently damaged.

The refrigeration device may have an expansion valve (13) for regulating the amount of refrigerant flowing to an interior heat exchanger (14), and a hot cargo mode for cooling a hot cargo and a normal cargo mode for cooling a normal cargo other than a hot cargo may be previously determined as the operation modes for the chilling operation. In the pull-down control, the operation control unit (52) may regulate the opening of the expansion valve (13) in accordance with the outside air temperature and drive the compressor (11). In the capacity control, the operation control unit (52) may regulate the opening of the expansion valve (13) in accordance with the outside air temperature and drive the compressor (11). When the temperature of the blown air falls below the set temperature (SP) during the pull-down control, with the hot cargo mode being selected as the operation mode, the operation control unit (52) may switch from the pull-down control to the capacity control. When the temperature of the blown air falls below a temperature that is higher than the set temperature (SP) by a predetermined temperature ($\Delta T$) during the pull-down control, with the normal cargo mode being selected as the operation mode, the operation control unit (52) may switch from the pull-down control to the capacity control.

In this configuration, the amount of refrigerant circulating in the refrigerant circuit (10) is adjusted mainly by controlling the volume of the refrigerant in the compressor (11) and adjusting the flow rate of the refrigerant discharged from the compressor (11). This configuration can achieve the same effects as the foregoing configuration in which the amount of refrigerant suctioned into the compressor (11) is regulated by the suction regulating valve (35). In other words, according to this configuration, the transition condition for switching from the pull-down control to the capacity control can be changed in accordance with the selected operation mode.

It is preferred that a first determination condition and a second determination condition be determined as the conditions for switching from the capacity control to the pull-down control, the first determination condition being a condition that the temperature of the blown air lower than that in the second determination condition is employed as a threshold and that a duration of time during which this temperature condition is satisfied is employed as a threshold.

According to this configuration, when the original cooling capacity becomes no longer enough to cool the interior and the temperature of the blown air exceeds the threshold employed for the second determination condition due to, for example, the frost deposits on the evaporator (14) during the capacity control, it is determined that the cooling capacity of the capacity control is not enough cool the interior. Accordingly, the capacity control is switched to the pull-down control of a higher cooling capacity so that the interior can be cooled adequately.

When there are no frost deposits on the evaporator (14) but the temperature of the interior rises due to the respiration heat of the hot cargoes during the capacity control, it means that the cooling capacity of the capacity control is not enough and that the temperature of the blown air does not reach the threshold employed for the second determination condition but that the temperature condition lower than this threshold may last for a long time. According to this configuration, such a state can be determined based on the first determination condition, and at the time of this determination the capacity control can be switched to the pull-down control of a higher cooling capacity, so that the interior can be cooled adequately.

In the refrigeration device, it is preferred that the first determination condition be a condition that a state in which the opening of the suction regulating valve (35) is greater than a predetermined initial opening (AP0) and the temperature of the blown air exceeds a temperature higher than the set temperature (SP) by a first predetermined temperature (T1) lasts for a predetermined period of time (Td). It is preferred that the second determination condition be a condition that the temperature of the blown air is higher than a temperature that is higher than the set temperature (SP) by a second predetermined temperature (T2) higher than the first predetermined temperature (T1).

In a case where the temperature of the blown air exceeds a temperature that is higher than the set temperature (SP) by the second predetermined temperature (T2) during the capacity control, it is considered that the cooling capacity of the capacity control is no longer enough to cool the interior.

According to this configuration, whether or not the cooling capacity of the capacity control is insufficient to cool the interior during the capacity control, can be determined appropriately based on whether the second determination condition is satisfied or not.

The cooling capacity of the capacity control is considered insufficient when, during the capacity control, the opening of the suction regulating valve (35) is equal to or greater than the initial opening (AP0), that is, when the temperature of the blown air is higher than the temperature corresponding to the initial opening (AP0) of the suction regulating valve

(35) and the temperature of the blown air is not as high as the temperature higher than the set temperature (SP) by the predetermined temperature (T2) but is higher than the set temperature (SP) by the predetermined temperature (T1), and when these states last for a period of time longer than the estimated period of time (Td).

According to this configuration, whether or not the cooling capacity of the capacity control is insufficient during the capacity control can be determined appropriately based on whether the first determination condition is satisfied or not.

The first predetermined temperature (T1) is a temperature lower than the second predetermined temperature (T2). When satisfying the first determination condition, therefore, unlike when satisfying the second determination condition, the capacity control is switched to the pull-down control while the temperature of the blown air is low, lowering the possibility that the capacity control is prolonged.

In the refrigeration device, the first determination condition may be a condition that a state in which the operational capacity of the compressor is greater than a predetermined capacity and the temperature of the blown air exceeds a temperature higher than the set temperature (SP) by the first predetermined temperature (T1) lasts for the predetermined period of time (Td). The second determination condition may be a condition that the temperature of the blown air exceeds a temperature that is higher than the set temperature (SP) by the second predetermined temperature (T2) higher than the first predetermined temperature (T1).

According to this configuration, whether or not the cooling capacity of the capacity control is insufficient to cool the interior during the capacity control can be determined appropriately based on whether the second determination condition is satisfied or not, as described above.

The cooling capacity of the capacity control is considered insufficient when, during the capacity control, the operational capacity of the compressor is greater than the predetermined capacity, that is, when the temperature of the blown air is higher than a temperature corresponding to the predetermined capacity and the temperature of the blown air is not as high as the temperature higher than the set temperature (SP) by the predetermined temperature (T2) but is higher than a temperature that is higher than the set temperature (SP) by the predetermined temperature (T1), and when these states last for a period of time longer than the estimated period of time (Td).

According to this configuration, whether or not the cooling capacity of the capacity control is insufficient during the capacity control can be determined appropriately based on whether the first determination condition is satisfied or not.

The first predetermined temperature (T1) is a temperature lower than the second predetermined temperature (T2). When satisfying the first determination condition, therefore, unlike when satisfying the second determination condition, the capacity control is switched to the pull-down control while the temperature of the blown air is low, lowering the possibility that the capacity control is prolonged.

Also, in the refrigeration device, when switching from the pull-down control to the capacity control after the first determination condition is satisfied, it is preferred that the operation control unit (52) begin the capacity control in the chilling mode with the maximum cooling capacity.

According to this configuration, the capacity control is started in the chilling mode with the maximum cooling capacity when the first determination condition is satisfied, that is, when it is determined that the temperature of the interior rises due to the respiration heat of the hot cargoes, that the cooling capacity of the capacity control is insufficient and that the pull-down control needs to be switched to the capacity control thereafter. Therefore, compared to when starting the capacity control in a chilling mode, the cooling capacity of which is not maximum, the possibility that the cooling capacity becomes insufficient can be lowered.

In the refrigeration device, when switching from the pull-down control to the capacity control after the second determination condition is satisfied and in a case where the pressure of the refrigerant at the discharge side of the compressor (11) is outside the predetermined range or equal to or greater than a predetermined upper limit, it is preferred that the operation control unit (52) begin the capacity control in the chilling mode with the maximum cooling capacity, but when the pressure of the refrigerant at the discharge side of the compressor (11) falls within the predetermined range and is less than the predetermined upper limit, it is preferred that the operation control unit (52) begin the capacity control in a chilling mode with a cooling capacity lower than the maximum cooling capacity.

According to this configuration, when the second determination condition is satisfied and then the pull-down control is switched to the capacity control, whether to start the capacity control in the chilling mode with the maximum cooling capacity or to start the capacity control in a chilling mode with a cooling capacity lower than the maximum cooling capacity, is appropriately determined in accordance with the pressure of the refrigerant at the discharge side of the compressor (11). Therefore, the risk of excessively cooling the interior can be lowered.

In the refrigeration device, when switching from the pull-down control to the capacity control and starting the capacity control in the chilling mode with the maximum cooling capacity, it is preferred that the operation control unit (52) set the opening of the suction regulating valve (35) at an opening greater than the predetermined initial opening (AP0), to start the capacity control.

According to this configuration, when switching from the pull-down control to the capacity control and starting the capacity control in the chilling mode with the maximum cooling capacity, the opening of the suction regulating valve (35) can be prevented from becoming equal to or less than an opening greater than the predetermined initial opening (AP0). In other words, compared to when regulating the suction regulating valve (35) to the predetermined initial opening (AP0), the amount of refrigerant to be suctioned into the compressor (11) can be increased more, thereby enhancing the cooling capacity.

In the refrigeration device, when switching from the pull-down control to the capacity control and starting the capacity control in the chilling mode with the maximum cooling capacity, the operation control unit (52) may set the operational capacity of the compressor at a capacity greater than the predetermined capacity, to start the capacity control.

According to this configuration, when switching from the pull-down control to the capacity control and starting the capacity control in the chilling mode with the maximum cooling capacity, the operational capacity of the compressor can be prevented from becoming equal to or lower than a capacity that is greater than the predetermined capacity. In other words, compared to when regulating the operational capacity of the compressor to the predetermined capacity, the amount of refrigerant to be suctioned into the compressor (11) can be increased more, thereby enhancing the cooling capacity.

In the refrigeration device, when switching from the pull-down control to the capacity control and starting the capacity control in the chilling mode with the maximum cooling capacity, and in a case where the opening of the expansion valve (13) is equal to or greater than an opening that is defined as an upper limit of the opening of the expansion valve (13) in the capacity control, it is preferred that the operation control unit (52) set the opening of the expansion valve (13) at an opening greater than a predetermined initial opening in accordance with the outside air temperature, to start the capacity control. However, in a case where the opening of the expansion valve (13) is less than the predetermined opening, it is preferred that the operation control unit (52) start the capacity control without regulating the opening of the expansion valve (13).

According to this configuration, when switching from the pull-down control to the capacity control and starting the capacity control in the chilling mode with the maximum cooling capacity, and in a case where the opening of the expansion valve (13) is equal to or greater than the upper limit of the expansion valve (13) in the capacity control, that is, when the outside air temperature is equal to or higher than the temperature corresponding to the upper limit of the opening of the expansion valve (13) and the cooling capacity needs to be improved, the amount of refrigerant flowing to the evaporator 14 can be increased more than when regulating the opening of the expansion valve (13) to the initial opening corresponding to the outside air temperature, thereby enhancing the cooling capacity.

The refrigeration device may have a temperature correction unit that corrects a control target value of the temperature of the blown air. A first control target value equivalent to the set temperature and a second control target value smaller than the first control target value may be defined as the control target value. When the control target value is set at the first control target value and the temperature of the blown air reaches the set temperature as a result of the pull-down control, and when the temperature of suctioned air fed from the interior to the evaporator is higher than a predetermined first reference value, the temperature correction unit may change the control target value to the second control target value, and the operation control unit may control the refrigeration device in such a manner that the temperature of the blown air reaches the second control target value.

According to this configuration, in a case where the temperature of the suctioned air is higher than the predetermined first reference value at the time when the temperature of the blown air reaches the set temperature as a result of the pull-down control, it is determined that the interior is not cooled sufficiently. In other words, in such a case, it is determined that the temperature of the interior is not low enough and is therefore high, and the control target value is changed to the second control target value. Then, the refrigeration device is controlled in such a manner that the temperature of the blown air reaches the second control target value. This configuration, therefore, can promote cooling of the interior more than when the control target value is constant, and can consequently bring the temperature of the interior close to the set temperature within a shorter period of time.

In the refrigeration device, when the temperature of the suctioned air becomes lower than a predetermined second reference value smaller than the first reference value, it is preferred that the temperature correction unit change the control target value to the first control target value.

According to this configuration, when the temperature of the suctioned air becomes lower than the second reference value, it is determined that the problem concerning insufficient cooling of the interior is resolved, and the control target value is changed from the second control target value to the first control target value, preventing the temperature of the interior from dropping significantly.

In the refrigeration device, when the temperature of the suctioned air becomes lower than the predetermined second reference value smaller than the first reference value, the temperature correction unit may increase the control target value to the first control target value in stages.

According to this configuration, when the temperature of the suctioned air becomes lower than the second reference value, it is determined that the problem concerning insufficient cooling of the interior is resolved, and the control target value is increased from the second control target value to the first control target value in stages. This configuration, therefore, can prevent the temperature of the interior from dropping significantly. Moreover, this configuration, in which the control target value is changed in stages, can prevent an increase in the temperature of the interior more than when the control target value is changed from the second control target value back to the first control target value.

The refrigeration device further has an interior fan that creates flows of the suctioned air and the blown air, and an interior fan control unit that controls an operation of the interior fan. In a case where the temperature of the suctioned air becomes lower than a predetermined third reference value smaller than the first reference value, the interior fan control unit may control the interior fan in such a manner that the rotational speed of the interior fan decreases, and in a case where the temperature of the suctioned air becomes higher than a predetermined fourth reference value greater than the first reference value, the interior fan control unit may control the interior fan in such a manner that the rotational speed of the interior fan increases.

According to this configuration, the interior fan is controlled in such a manner that the rotational speed thereof decreases, when the temperature of the suctioned air becomes lower than the third reference value. Therefore, the temperature of the interior can be prevented from dropping significantly, resulting in lower power consumption. Thereafter, when the temperature of the suctioned air becomes higher than the fourth reference value, the interior fan is controlled in such a manner that the rotational speed thereof increases, preventing the temperature of the interior from rising significantly.

1 Refrigeration device
10 Refrigerant circuit
11 Compressor
12 Condenser
13 Expansion valve
14 Evaporator (interior heat exchanger)
35 Suction proportional valve (suction regulating valve)
50 Control unit
52 Operation control unit
AP0 Predetermined initial opening (of the suction regulating valve)
ES Outside air sensor
SP Set temperature
SS Blow temperature sensor
T1 First predetermined temperature
T2 Second predetermined temperature
Td Predetermined period of time

The invention claimed is:
1. A refrigeration device that executes a chilling operation for cooling an interior so that the temperature of the interior reaches a set temperature that is set within a predetermined temperature range, the refrigeration device comprising:

an operation control unit that switches between, in the chilling operation, pull-down control and capacity control for cooling the interior with a cooling capacity lower than that of the pull-down control;
an expansion valve for regulating an amount of refrigerant flowing to an interior heat exchanger; and
a suction regulating valve for regulating an amount of refrigerant suctioned into a compressor,
wherein a hot cargo mode for cooling a hot cargo and a normal cargo mode for cooling a normal cargo other than a hot cargo are defined as operation modes for the chilling operation,
the operation control unit performs the pull-down control until the temperature of air blown toward the interior reaches at least the set temperature,
in the pull-down control, the operation control unit regulates an opening of the expansion valve in accordance with an outside air temperature and drives the compressor with the suction regulating valve fully opened, and in the capacity control, the operation control unit regulates the opening of the expansion valve in accordance with the outside air temperature and drives the compressor while regulating an opening of the suction regulating valve in accordance with the temperature of the blown air,
when the temperature of the blown air falls below the set temperature during the pull-down control, with the hot cargo mode being selected as the operation mode, the operation control unit switches from the pull-down control to the capacity control, and
when the temperature of the blown air falls below a temperature that is higher than the set temperature by a predetermined temperature during the pull-down control, with the normal cargo mode being selected as the operation mode, the operation control unit switches from the pull-down control to the capacity control.

2. The refrigeration device according to claim 1, wherein a first determination condition and a second determination condition are defined as a condition for switching from the capacity control to the pull-down control, the first determination condition being a condition that the temperature of the blown air lower than that in the second determination condition is employed as a threshold and that a duration of time during which this temperature condition is satisfied is employed as a threshold.

3. The refrigeration device according to claim 2, wherein the first determination condition is a condition that a state in which an opening of the suction regulating valve is greater than a predetermined initial opening and the temperature of the blown air exceeds a temperature higher than the set temperature by a first predetermined temperature lasts for a predetermined period of time, and
the second determination condition is a condition that the temperature of the blown air exceeds a temperature that is higher than the set temperature by a second predetermined temperature higher than the first predetermined temperature.

4. The refrigeration device according to claim 2, wherein the first determination condition is a condition that a state in which an operational capacity of the compressor is greater than a predetermined capacity and the temperature of the blown air exceeds a temperature higher than the set temperature by a first predetermined temperature lasts for a predetermined period of time, and
the second determination condition is a condition that the temperature of the blown air exceeds a temperature that is higher than the set temperature by a second predetermined temperature higher than the first predetermined temperature.

5. The refrigeration device according to claim 2, wherein, when switching from the pull-down control to the capacity control after the first determination condition is satisfied, the operation control unit starts the capacity control in a chilling mode with a maximum cooling capacity.

6. The refrigeration device according to claim 2, wherein when switching from the pull-down control to the capacity control after the second determination condition is satisfied and in a case where the pressure of refrigerant at a discharge side of the compressor is outside a predetermined range or equal to or greater than a predetermined upper limit, the operation control unit starts the capacity control in a chilling mode with a maximum cooling capacity, and
when the pressure of the refrigerant at the discharge side of the compressor falls within the predetermined range and is less than the predetermined upper limit, the operation control unit starts the capacity control in a chilling mode with a cooling capacity lower than the maximum cooling capacity.

7. The refrigeration device according to claim 5, wherein when switching from the pull-down control to the capacity control and starting the capacity control in the chilling mode with the maximum cooling capacity, the operation control unit sets an opening of the suction regulating valve at an opening greater than a predetermined initial opening, to start the capacity control.

8. The refrigeration device according to claim 5, wherein when switching from the pull-down control to the capacity control and starting the capacity control in the chilling mode with the maximum cooling capacity, the operation control unit sets an operational capacity of the compressor at a capacity greater than a predetermined capacity, to start the capacity control.

9. The refrigeration device according to claim 2, wherein when switching from the pull-down control to the capacity control and starting the capacity control in a chilling mode with a maximum cooling capacity, and in a case where the opening of the expansion valve is equal to or greater than an opening that is defined as an upper limit of the opening of the expansion valve in the capacity control, the operation control unit sets the opening of the expansion valve at an opening greater than a predetermined initial opening in accordance with the outside air temperature, to start the capacity control, and
in a case where the opening of the expansion valve is less than the predetermined opening, the operation control unit starts the capacity control without regulating the opening of the expansion valve.

10. The refrigeration device according to claim 1, comprising:
a temperature correction unit that corrects a control target value of the temperature of the blown air,
wherein a first control target value equivalent to the set temperature and a second control target value smaller than the first control target value are defined as the control target value, and
when the control target value is set at the first control target value and the temperature of the blown air reaches the set temperature as a result of the pull-down control, and when the temperature of suctioned air fed from the interior to an evaporator is higher than a predetermined first reference value, the temperature correction unit changes the control target value to the second control target value, and the operation control unit controls the refrigeration device in such a manner that the temperature of the blown air reaches the second control target value.

11. The refrigeration device according to claim 10, wherein
when the temperature of the suctioned air becomes lower than a predetermined second reference value smaller than the first reference value, the temperature correction unit changes the control target value to the first control target value.

12. The refrigeration device according to claim 10, wherein
when the temperature of the suctioned air becomes lower than a predetermined second reference value smaller than the first reference value, the temperature correction unit increases the control target value to the first control target value in stages.

13. The refrigeration device according to claim 10, comprising:
an interior fan that creates flows of the suctioned air and the blown air; and
an interior fan control unit that controls an operation of the interior fan,
wherein in a case where the temperature of the suctioned air becomes lower than a predetermined third reference value smaller than the first reference value, the interior fan control unit controls the interior fan in such a manner that a rotational speed of the interior fan decreases, and
in a case where the temperature of the suctioned air becomes higher than a predetermined fourth reference value greater than the first reference value, the interior fan control unit controls the interior fan in such a manner that the rotational speed of the interior fan increases.

14. A refrigeration device that executes a chilling operation for cooling an interior so that the temperature of the interior reaches a set temperature that is set within a predetermined temperature range, the refrigeration device comprising:
an operation control unit that switches between, in the chilling operation, pull-down control and capacity control for cooling the interior with a cooling capacity lower than that of the pull-down control;
an expansion valve for regulating an amount of refrigerant flowing to an interior heat exchanger,
wherein a hot cargo mode for cooling a hot cargo and a normal cargo mode for cooling a normal cargo other than a hot cargo are defined as operation modes for the chilling operation,
the operation control unit performs the pull-down control until the temperature of air blown toward the interior reaches at least the set temperature,
in the pull-down control, the operation control unit regulates an opening of the expansion valve in accordance with an outside air temperature and drives the compressor, and in the capacity control, the operation control unit regulates the opening of the expansion valve in accordance with the outside air temperature and drives the compressor,
when the temperature of the blown air falls below the set temperature during the pull-down control, with the hot cargo mode being selected as the operation mode, the operation control unit switches from the pull-down control to the capacity control, and
when the temperature of the blown air falls below a temperature that is higher than the set temperature by a predetermined temperature during the pull-down control, with the normal cargo mode being selected as the operation mode, the operation control unit switches from the pull-down control to the capacity control.

* * * * *